United States Patent
Klemmer et al.

(10) Patent No.: US 10,778,482 B2
(45) Date of Patent: Sep. 15, 2020

(54) BIT SLICER CIRCUIT FOR S-FSK RECEIVER, INTEGRATED CIRCUIT, AND METHOD ASSOCIATED THEREWITH

(71) Applicant: Texas Instruments Incorporated, Dallas, TX (US)

(72) Inventors: Nikolaus Klemmer, Dallas, TX (US); Amneh Mohammed Akour, Plano, TX (US); Abhijit Anant Patki, Bangalore (IN); Timothy Patrick Pauletti, Dallas, TX (US); Tarkesh Pande, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/515,248

(22) Filed: Jul. 18, 2019

(65) Prior Publication Data
US 2020/0259687 A1    Aug. 13, 2020

Related U.S. Application Data

(60) Provisional application No. 62/804,452, filed on Feb. 12, 2019.

(51) Int. Cl.
*H04B 1/16*    (2006.01)
*H04L 27/14*    (2006.01)
(Continued)

(52) U.S. Cl.
CPC .............. *H04L 27/14* (2013.01); *H04B 1/69* (2013.01); *H04L 27/06* (2013.01)

(58) Field of Classification Search
CPC ............ H04L 27/14; H04L 27/06; H04B 1/69
(Continued)

(56) References Cited

U.S. PATENT DOCUMENTS 4,811,269 A * 3/1989 Hirose .................. G06F 7/5324
                                                         708/627
4,941,121 A * 7/1990 Zurawski .............. G06F 7/5272
                                                         708/518
(Continued)

OTHER PUBLICATIONS

"SunSpec® Rapid Shutdown Transmit and Receive Reference Design" Texas Instruments, TI Designs: TIDA-060001, TIDUE68-May 2018, 39 pages.
(Continued)

*Primary Examiner* — Sonny Trinh
(74) *Attorney, Agent, or Firm* — Lawrence J. Bassuk; Charles A. Brill; Frank D. Cimino

(57) ABSTRACT

An integrated circuit includes a bit slicing circuit with a processing circuit. The processing circuit receives discrete frequency power estimates based on an S-FSK waveform received by an S-FSK receiver associated with the bit slicing circuit. The discrete frequency power estimates are representative of digital logic levels in a series of data frames modulated using S-FSK to form the S-FSK waveform. Each data frame including at least one word. Each word includes bit periods. The processing circuit receives SNR parameters that represent a dynamic SNR for the respective discrete frequency power estimates in relation to the series of data frames. The processing circuit selects a bit slicing technique from a set of available bit slicing techniques to generate data bit values for bit periods of the discrete frequency power estimates based on the SNR parameters. A method for performing bit slicing in an S-FSK receiver is also disclosed.

20 Claims, 12 Drawing Sheets

(51) Int. Cl.
*H04L 27/06* (2006.01)
*H04B 1/69* (2011.01)

(58) Field of Classification Search
USPC .................................................. 455/337
See application file for complete search history.

(56) References Cited

U.S. PATENT DOCUMENTS

| | | | |
|---|---|---|---|
| 7,884,278 B2 | 2/2011 | Powell et al. | |
| 8,013,472 B2 | 9/2011 | Adest et al. | |
| 8,035,249 B2 | 10/2011 | Shaver, II et al. | |
| 8,271,599 B2 | 9/2012 | Eizips et al. | |
| 8,274,172 B2 | 9/2012 | Hadar et al. | |
| 8,320,233 B2 * | 11/2012 | Razazian | H04B 3/54 370/208 |
| 8,325,059 B2 | 12/2012 | Rozenboim | |
| 8,427,009 B2 | 4/2013 | Shaver, II et al. | |
| 8,531,005 B2 | 9/2013 | Whitfield et al. | |
| 8,587,151 B2 | 11/2013 | Adest et al. | |
| 8,653,689 B2 | 2/2014 | Rozenboim | |
| 8,669,675 B2 | 3/2014 | Capp et al. | |
| 8,816,535 B2 | 8/2014 | Adest et al. | |
| 8,823,218 B2 | 9/2014 | Hadar et al. | |
| 8,854,193 B2 | 10/2014 | Makhota et al. | |
| 8,933,321 B2 | 1/2015 | Hadar et al. | |
| 8,947,194 B2 | 2/2015 | Sella et al. | |
| 9,007,210 B2 | 4/2015 | Avrutsky et al. | |
| 9,112,379 B2 | 8/2015 | Sella et al. | |
| 9,124,139 B2 | 9/2015 | Eizips et al. | |
| 9,143,036 B2 | 9/2015 | Avrutsky | |
| 9,184,794 B1 | 11/2015 | Ibrahim et al. | |
| 9,184,967 B1 | 11/2015 | Ibrahim et al. | |
| 9,258,829 B1 | 2/2016 | Ibrahim et al. | |
| 9,377,765 B2 | 6/2016 | Makhota et al. | |
| 9,401,599 B2 | 6/2016 | Har-Shai et al. | |
| 9,397,612 B2 | 7/2016 | Hadar et al. | |
| 9,438,035 B2 | 9/2016 | Capp et al. | |
| 9,590,526 B2 | 3/2017 | Adest et al. | |
| 9,960,667 B2 | 5/2018 | Adest et al. | |
| 2010/0207592 A1 | 8/2010 | Hester et al. | |
| 2011/0140774 A1 | 6/2011 | Kaya et al. | |
| 2011/0255557 A1 * | 10/2011 | Varadarajan | H04B 1/69 370/474 |
| 2012/0049816 A1 | 3/2012 | Hester | |
| 2012/0049818 A1 | 3/2012 | Hester | |
| 2012/0093198 A1 | 4/2012 | Dabak et al. | |
| 2012/0126624 A1 | 5/2012 | Hester et al. | |
| 2012/0139345 A1 | 6/2012 | Ye et al. | |
| 2012/0314744 A1 | 12/2012 | Vedantham et al. | |
| 2012/0320931 A1 | 12/2012 | Vedantham et al. | |
| 2012/0320932 A1 | 12/2012 | Xu et al. | |
| 2012/0320995 A1 | 12/2012 | Dabak et al. | |
| 2012/0320996 A1 | 12/2012 | Dabak et al. | |
| 2012/0324322 A1 | 12/2012 | Vedantham et al. | |
| 2012/0327770 A1 | 12/2012 | Vijayasankar et al. | |
| 2012/0327987 A1 | 12/2012 | Dabak et al. | |
| 2013/0051268 A1 | 2/2013 | Nassar et al. | |
| 2013/0051320 A1 | 2/2013 | Pande et al. | |
| 2013/0051446 A1 | 2/2013 | Vijayasankar et al. | |
| 2013/0051482 A1 | 2/2013 | Nassar et al. | |
| 2013/0089124 A1 | 4/2013 | Kim et al. | |
| 2013/0101055 A1 | 4/2013 | Pande et al. | |
| 2013/0121425 A1 | 5/2013 | Pande et al. | |
| 2013/0223457 A1 | 8/2013 | Pande et al. | |
| 2013/0254615 A1 | 9/2013 | Vijayasankar et al. | |
| 2013/0266081 A1 | 10/2013 | Pande et al. | |
| 2013/0279515 A1 | 10/2013 | Vijayasankar et al. | |
| 2013/0294531 A1 | 11/2013 | Vedantham et al. | |
| 2013/0301649 A1 | 11/2013 | Vijayasankar et al. | |
| 2013/0322554 A1 | 12/2013 | Vijayasankar et al. | |
| 2013/0343403 A1 | 12/2013 | Vijayasankar et al. | |
| 2013/0343404 A1 | 12/2013 | Vijayasankar et al. | |
| 2014/0105313 A1 | 5/2014 | Kim et al. | |
| 2014/0146900 A1 | 5/2014 | Dabak et al. | |
| 2014/0229748 A1 | 8/2014 | Li et al. | |
| 2015/0043596 A1 | 2/2015 | Lin et al. | |
| 2015/0071077 A1 | 3/2015 | Vijayasankar et al. | |
| 2015/0071306 A1 | 3/2015 | Lin et al. | |
| 2015/0071364 A1 | 3/2015 | Batra et al. | |
| 2015/0098569 A1 | 4/2015 | Vijayasankar et al. | |
| 2015/0180539 A1 | 6/2015 | Vedantham et al. | |
| 2015/0180680 A1 | 6/2015 | Vijayasankar et al. | |
| 2015/0236753 A1 | 8/2015 | Pande et al. | |
| 2015/0341084 A1 | 11/2015 | Kim et al. | |
| 2015/0349844 A1 | 12/2015 | Vijayasankar et al. | |
| 2015/0381355 A1 | 12/2015 | Vijayasankar et al. | |
| 2016/0043773 A1 | 2/2016 | Pande et al. | |
| 2016/0050045 A1 | 2/2016 | Vijayasankar et al. | |
| 2016/0079761 A1 | 3/2016 | Pilawa-Podgurski et al. | |
| 2016/0094373 A1 | 3/2016 | Ibrahim et al. | |
| 2016/0112548 A1 | 4/2016 | Dabak et al. | |
| 2016/0119028 A1 | 4/2016 | Vijayasankar et al. | |
| 2016/0127056 A1 | 5/2016 | Soman et al. | |
| 2016/0233923 A1 | 8/2016 | Vedantham et al. | |
| 2016/0323132 A1 | 11/2016 | Ibrahim et al. | |
| 2016/0330213 A1 | 11/2016 | Vijayasankar et al. | |
| 2016/0344450 A1 | 11/2016 | Pande et al. | |
| 2017/0093279 A1 | 3/2017 | Hezar et al. | |
| 2017/0195228 A1 | 7/2017 | Vijayasankar et al. | |
| 2017/0317803 A1 | 11/2017 | Lin et al. | |
| 2017/0366230 A1 | 12/2017 | Pande et al. | |
| 2018/0219480 A1 | 8/2018 | Hezar et al. | |
| 2018/0234526 A1 | 8/2018 | Xu et al. | |
| 2018/0294840 A1 | 10/2018 | Vijayasankar et al. | |
| 2019/0052313 A1 | 2/2019 | Kim et al. | |
| 2019/0140693 A1 | 5/2019 | Kim et al. | |
| 2019/0173643 A1 | 6/2019 | Lin et al. | |

OTHER PUBLICATIONS

"Communication Signal for Rapid Shutdown SunSpec Interoperability Specification" SunSpec Alliance, Approved, Version 34, Aug. 21, 2017, 25 pages.

"Communication Signal for Rapid Shutdown SunSpec Interoperability Specification" SunSpec Alliance, Test, Version 28, Oct. 28, 2016, 24 pages.

D. Shmilovitz, "On the control of photovoltaic maximum power point tracker via output parameters" IEEE Proc.—Electr. Power Appl., vol. 152, No. 2, Mar. 2005, pp. 239-248.

Robert C.N. Pilawa-Podgurski et al., "Submodule Integrated Distributed Maximum Power Point Tracking for Solar Photovoltaic Applications" IEEE Transactions on Power Electronics, vol. 28, No. 6, Jun. 2013, pp. 2957-2967.

Qin et al . . . , "A Distributed Approach to Maximum Power Point Tracking for Photovoltaic Submodule Differential Power Processing" IEEE Transactions on Power Electronics, vol. 30, No. 4, Apr. 2015, pp. 2024-2040.

Shenoy et al., "Differential Power Processing for Increased Energy Production and Reliability of Photovoltaic Systems" IEEE Transactions on Power Electronics, vol. 28, No. 6, Jun. 2013, pp. 2968-2979.

Robert C.N. Pilawa-Podgurski et al., "Integrated CMOS Energy Harvesting Converter With Digital Maximum Power Point Tracking for a Portable Thermophotovoltaic Power Generator" IEEE Journal of Emerging and Selected Topics in Power Electronics, vol. 3, No. 4, Jun. 2015, pp. 1021-1035.

Pilawa-Podgurski, R.C.N. et al. "Low-power Maximum Power Point Tracker with Digital Control for Thermophotovoltaic Generators." Applied Power Electronics Conference and Exposition (APEC), 2010 Twenty-Fifth Annual IEEE. 2010. 961-967. Copyright © 2010, IEEE, pp. 961-967.

R.C.N. Pilawa-Podgurski, W. Li, I. Celanovic, D.J. Perreault "Integrated CMOS DC-DC Converter with Digital Maximum Power Point Tracking for a Portable Thermophotovoltaic Power Generator," IEEE Energy Conversion Congress and Exposition, 2011, pp. 197-204.

Intertek, Standard Update Notice (SUN), Issued: Aug. 14, 2018, 7 pgs.

Maxim Integrated, "Enable Flexible PV System Design with Cell-String Optimizers", Aug. 29, 2016, 9 pages.

(56) References Cited

OTHER PUBLICATIONS

Rick Ivins, "2014 NEC 690.12 Rapid Shutdown for String Inverters on Flat Roofs", Aug. 16, 2016, https://www.purepower.com/blog/nec-690-12-rapid-shutdown-of-pv-systems-on-buildings/, downloaded May 22, 2019, 5 pages.

Rick Ivins, "2017 Nec 690.12 Rapid Shutdown—Important Changes", https://www.purepower.com/blog/2017-nec-690.12-rapid-shutdown-important-changes/, downloaded May 22, 2019, 5 pages.

"SmartPSB2000L Smart PV Safety Box Quick Guide", Issue: 05, Part No. 31509508, Date: Aug. 22, 2018, Huawei Technologies Col, Ltd., 12 pages.

Solar Edge Safety Functions Firefighting, "Firefighting & PV Systems—Risks and Solutions", https://www.solaredge.com/sites/default/files/firefighting_and_pv_systems_risks_and_solutions_eng.pdf, downloaded May 22, 2019, 26 pages.

Texas Instruments, "Solar Power Optimizer", http://www.ti.com/solution/solar_micro_converter_dc_dc_power_optimizer/, downloaded May 22, 2019, 2 pages.

Tigo® Flex MLPE, "Smart Module Platform", TS4, PV Module Integrated Platform, PV 2.0, Tigo Energy Inc., Sep. 10, 2018, 4 pages.

* cited by examiner

BIT SLICER CIRCUIT FOR S-FSK RECEIVER, INTEGRATED CIRCUIT, AND METHOD ASSOCIATED THEREWITH Under 35 U.S.C. § 119, this application claims priority to, and the benefit of, U.S. Provisional Patent Application Ser. No. 62/804,452, entitled "Adaptive S-FSK Slicer," filed Feb. 12, 2019, the entirety of which is hereby incorporated by reference.

BACKGROUND

Spread frequency-shift keying (S-FSK) is a modulation and demodulation technique that combines advantages of a classical spread spectrum system (e.g., immunity against narrowband interferences) with advantages of a classical FSK system (e.g., low-complexity). An S-FSK transmitter outputs a tone at one of two frequencies depending on the value of a digital data bit. The frequencies may be referred to as a "mark" frequency ($f_M$) and a "space" frequency ($f_S$) (see FIG. 14). For example, the S-FSK transmitter may transmit a signal on the "space" frequency to represent an "OFF" data bit and on the "mark" frequency to represent an "ON" data bit. The difference between S-FSK and classical FSK is that the $f_M$ and $f_S$ frequencies are farther apart from each other ("spread"). By placing $f_S$ far from $f_M$, the channel effect on the quality of the received two signals becomes independent. In other words, each frequency will have its own attenuation factor and local narrow-band noise spectrum. Thus, a narrow band interferer only affects one of the two frequency signals.

An S-FSK receiver performs FSK demodulation at the transmitted "mark" and "space" frequencies resulting in two demodulated signals, $f_M$ for the "mark" frequency and $f_S$ for the "space" frequency (see FIG. 14). If the average reception quality of the demodulated "mark" and "space" frequency signals is similar, a decision unit may decide the value of the digital data bit based on the demodulated signal with the higher reception quality. If, however, the average reception quality of one demodulated frequency signal is better than the quality of the other frequency signal, the decision unit may compare the demodulated signal of the better channel with a threshold (T) in deciding the value of the digital data bit. In other words, the S-FSK receiver could perform an FSK demodulation if both channels are good or an on-off keyed (OOK) demodulation if one channel is bad. In this scenario, the decision unit ignores the demodulated signal having lower quality. Depending on the application for S-FSK modulation, there could be periods of zero energy in the transmitted frequency signals. If the average reception quality is below the threshold (T) for both demodulated frequencies, the decision unit may interpret this condition as a zero-energy state. Higher level coding may be employed in the S-FSK transmitter to generate bit-streams that represent code words or commands which are modulated in the S-FSK waveform.

For example, SunSpec Interoperability Specification, Communication Signal for Rapid Shutdown, Version 34, describes an S-FSK communication system for transmission and reception of S-FSK waveforms carrying Barker codes representing a sequence of "ON" and "OFF" digital data bits that are modulated and demodulated based on the "mark" and "space" frequencies of the S-FSK modulation scheme. This S-FSK communication system uses power line communication (PLC) techniques to exchange sequences of Barker code words that represent commands for controlling photovoltaic (PV) arrays. For example, commands can be used to implement rapid shutdown or other commands can be used to keep the arrays alive. FIG. 15 shows PLC physical layer transmission format requirements presented in SunSpec Interoperability Specification, Communication Signal for Rapid Shutdown, Version 34.

SUMMARY

An example of an integrated circuit includes a bit slicing circuit with a processing circuit. The processing circuit receives first and second discrete frequency power estimates from a digital filtering circuit. The first and second discrete frequency power estimates are based on a spread frequency-shift keying (S-FSK) waveform received by an S-FSK receiver associated with the bit slicing circuit. The first and second discrete frequency power estimates are representative of digital logic levels in a series of data frames modulated using S-FSK to form the S-FSK waveform. For example, the first and second discrete frequency power estimates are discrete time waveforms of the received inputs (i.e., S-FSK waveform) after passing through narrow-band filters centered around the first frequency and second frequency, respectively. Each data frame including at least one word. Each word includes multiple bit periods. The processing circuit receives first and second signal-to-noise ratio (SNR) parameters from a parameter computation circuit. The first and second SNR parameters represent a dynamic SNR for the respective first and second discrete frequency power estimates in relation to the series of data frames. The processing circuit selects a bit slicing technique from a set of available bit slicing techniques to generate a data bit value for an individual bit period of the first and second discrete frequency power estimates based on the first and second SNR parameters.

An example of a method for performing bit slicing in an S-FSK receiver includes receiving first and second discrete frequency power estimates from a digital filtering circuit at a bit slicing circuit. The first and second discrete frequency power estimates are based on an S-FSK waveform received by an S-FSK receiver associated with the bit slicing circuit. The first and second discrete frequency power estimates are representative of digital logic levels in a series of data frames modulated using S-FSK to form the S-FSK waveform. Each data frame including at least one word. Each word includes multiple bit periods. First and second SNR parameters are received from a parameter computation circuit at the bit slicing circuit. The first and second SNR parameters represent a dynamic SNR for the respective first and second discrete frequency power estimates in relation to the series of data frames. A bit slicing technique is selected from a set of available bit slicing techniques to generate a data bit value for an individual bit period of the first and second discrete frequency power estimates based on the first and second SNR parameters.

Another example of a method for performing bit slicing in an S-FSK receiver includes receiving first and second discrete frequency power estimates from a digital filtering circuit at a bit slicing circuit. The first and second discrete frequency power estimates are based on an S-FSK waveform received by an S-FSK receiver associated with the bit slicing circuit. The first and second discrete frequency power estimates are representative of digital logic levels in a series of data frames modulated using S-FSK to form the S-FSK waveform. Each data frame including at least one word. Each word includes multiple bit periods. First and second threshold parameters are received from a parameter computation circuit at the bit slicing circuit. The first and second threshold parameters represent dynamic thresholds between "ON" and "OFF" logic levels for bit periods associated with the respective first and second discrete frequency power estimates in relation to the series of data frames. The first discrete frequency power estimate is determined at an "ON" logic level for an individual bit period where the first discrete frequency power estimate is greater than the first threshold parameter. The second discrete frequency power estimate is determined at an "ON" logic level for the individual bit period where the second discrete frequency power estimate is greater than the second threshold parameter. First and second SNR parameters are received from the parameter computation circuit at the bit slicing circuit. The first and second SNR parameters represent a dynamic SNR for the respective first and second discrete frequency power estimates in relation to the series of data frames. After determining both first and second discrete frequency power estimates are at "ON" logic levels, a "+1" tri-level value is generated as a data bit value for an individual bit period of the first and second discrete frequency power estimates where the first SNR parameter is greater than the second SNR parameter, otherwise a "−1" tri-level value is generated as the data bit value for the individual bit period. In a further example of the method, two-level data bits are generated from the tri-level sliced output by averaging or correlating with an outer code.

DETAILED DESCRIPTION

Figure 1:
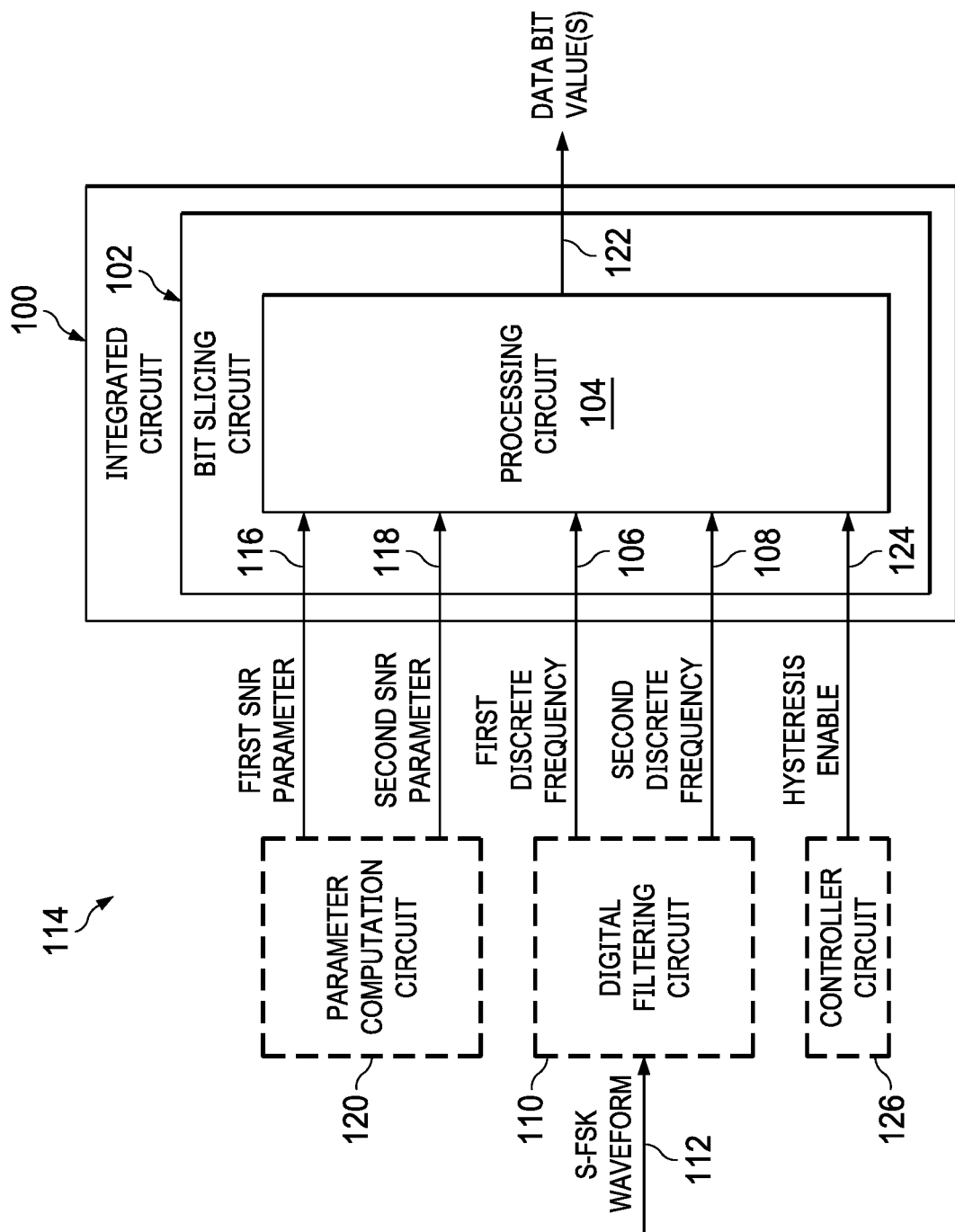
FIG. 1 is a block diagram of an example of an integrated circuit that includes a bit slicing circuit.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner like the term "comprising", and thus should be interpreted to mean "including, but not limited to . . . "

With reference to FIG. 1, an example of an integrated circuit 100 includes a bit slicing circuit 102 with a processing circuit 104. The processing circuit 104 receives first and second discrete frequency power estimates 106, 108 (e.g., "mark" and "space" frequency signals) from a digital filtering circuit 110. The first and second discrete frequency power estimates 106, 108 are based on a spread frequency-shift keying (S-FSK) waveform 112 received by an S-FSK receiver 114 associated with the bit slicing circuit 102. The first and second discrete frequency power estimates 106, 108 are representative of digital logic levels (e.g., "ON" or "OFF" logic levels) in a series of data frames modulated using S-FSK to form the S-FSK waveform 112. For example, the first and second discrete frequency power estimates are discrete time waveforms of the received inputs (i.e., S-FSK waveform) after passing through narrow-band filters centered around the first frequency and second frequency, respectively. Each data frame including at least one word (e.g., data word(s) and/or zero energy word(s)). Each data word and zero energy word includes multiple bit periods. The processing circuit 104 receives first and second signal-to-noise ratio (SNR) parameters 116, 118 (e.g., "mark" and "space" SNR parameters) from a parameter computation circuit 120. The first and second SNR parameters 116, 118 represent a dynamic SNR for the respective first and second discrete frequency power estimates 106, 108 in relation to the series of data frames. The processing circuit 104 selects a bit slicing technique from a set of available bit slicing techniques to generate a data bit value 122 for an individual bit period of the first and second discrete frequency power estimates 106, 108 based on the first and second SNR parameters 116, 118.

In another example of the integrated circuit 100, in conjunction with selecting the bit slicing technique, the processing circuit 104 arranges the first and second SNR parameters 116, 118 for the individual bit period as an ordered pair in relation to a coordinate system 1200 (see, e.g., FIG. 12) with a first axis 1202 representative of the first SNR parameter 116 and a second axis 1204 representative of the second SNR parameter 118. The coordinate system 1200 uses predetermined SNR thresholds (e.g., TH1 1206, TH2 1208, TH3 1210) to define regions (e.g., Region 1 1212, Region 2 1214, Region 3 1216, Region 4 1218) within the coordinate system 1200 representative of alternate bit slicing techniques from the set of available bit slicing techniques. The processing circuit 104 selects the bit slicing technique based on a specific region of the coordinate system 1200 with which the ordered pair for the first and second SNR parameters 116, 118 is associated.

In a further example of the integrated circuit 100, in conjunction with selecting the bit slicing technique, the processing circuit 104 selects a "zero energy" bit slicing technique to generate a "0" value as the data bit value 122 for the individual bit period where the first and second SNR parameters 116, 118 are associated with a first region 1212 of the coordinate system 1200.

In an even further example of the integrated circuit 100, in conjunction with selecting the "zero energy" bit slicing technique, the processing circuit 104 selects the "zero energy" bit slicing technique based on the following criteria: i) a sum of the first and second SNR parameters 116, 118 is less than a first SNR threshold (TH1) 1206 (see, e.g., FIG. 12), ii) the first SNR parameter 116 is less than a second SNR threshold (TH2) 1204, and iii) the second SNR parameter 118 is less than the second SNR threshold 1208. The second SNR threshold 1208 is less than the first SNR threshold 1206.

In another even further example of the integrated circuit 100, the first region 1212 (see, e.g., FIG. 13) of the coordinate system 1200 is defined by rising and falling thresholds 1320, 1322 that provide a hysteresis for transitions between the first region 1212 and other regions of the coordinate system 1200 based on the first and second SNR parameters 116, 118 in relation to the series of data frames. The processing circuit 104 receives a hysteresis enable signal 124 from a controller circuit 126. The hysteresis enable signal 124 activates use of the rising and falling thresholds 1320, 1322. The rising threshold 1320 for the hysteresis causes the "zero energy" bit slicing technique to be de-selected based on the following criteria: i) the sum of the first and second SNR parameters 116, 118 is rising in relation to a preceding sum and becomes greater than a first SNR threshold (TH1) 1206, ii) the first SNR parameter 116 is rising in relation to a preceding value for the first SNR parameter 116 and becomes greater than a second SNR threshold (TH2) 1208, and iii) the second SNR parameter 118 is rising in relation to a preceding value for the second SNR parameter 118 and becomes greater than the second SNR threshold 1208. The second SNR threshold 1208 is less than the first SNR threshold 1206. The falling threshold 1322 for the hysteresis causes the "zero energy" bit slicing technique to be selected based on the following criteria: i) the sum of the first and second SNR parameters 116, 118 is falling in relation to a preceding sum and becomes less than a fourth SNR threshold (TH4) 1324, ii) the first SNR parameter 116 is falling in relation to the preceding value for the first SNR parameter 116 and becomes less than a fifth SNR threshold (TH5) 1326, and iii) the second SNR parameter 118 is falling in relation to the preceding value for the second SNR parameter 118 and becomes less than the fifth SNR threshold 1326. The fifth SNR threshold 1326 is less than the fourth SNR threshold 1324. The fifth SNR threshold 1326 is less than the second SNR threshold 1208 and the fourth SNR threshold 1324 is less than the first SNR threshold 1206.

Figure 2:
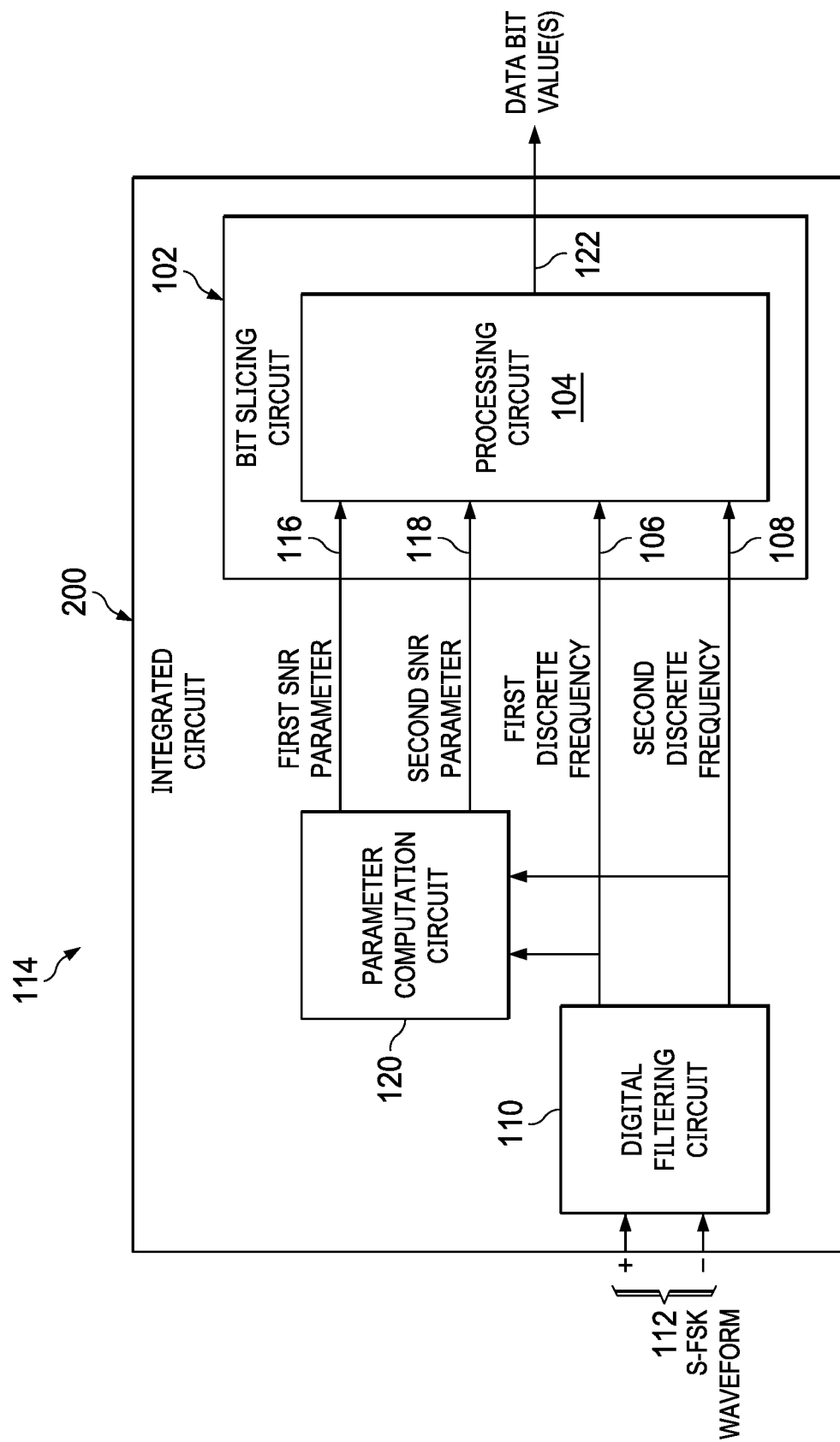
FIG. 2 is a block diagram of an example of an integrated circuit that includes an S-FSK receiver.

With reference to FIG. 2, another example of an integrated circuit 200 includes a bit slicing circuit 102 with a processing circuit 104, a digital filtering circuit 110, and a parameter computation circuit 120. The digital filtering circuit 110 receives the S-FSK waveform 112, processes the S-FSK waveform 112 to create the first and second discrete frequency power estimates 106, 108, and provides the first and second discrete frequency power estimates 106, 108 to the processing circuit 104. The parameter computation circuit 120 receives the first and second discrete frequency power estimates 106, 108 from the digital filtering circuit 110, processes the first and second discrete frequency power estimates 106, 108 to create the first and second SNR parameters 116, 118, and provides the first and second SNR parameters 116, 118 to the processing circuit 104.

Figure 3:
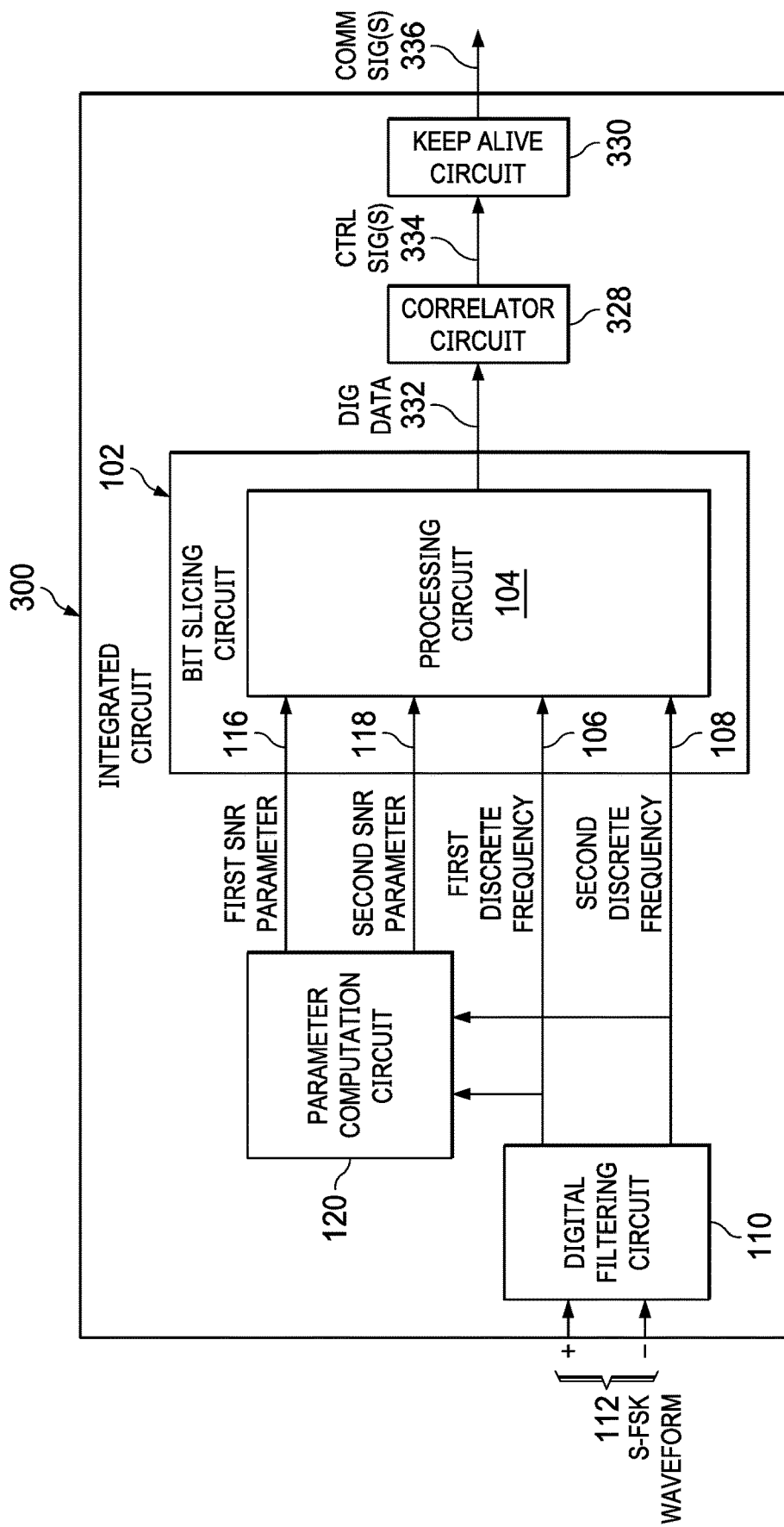
FIG. 3 is a block diagram of an example of an integrated circuit that includes a photovoltaic (PV) array rapid shutdown control circuit.

With reference to FIG. 3, yet another example of an integrated circuit 300 of claim 2, a bit slicing circuit 102 with a processing circuit 104, a digital filtering circuit 110, a parameter computation circuit 120, a correlator circuit 328, and a keep alive circuit 330. The processing circuit 102 generates bit data values 122 (see FIG. 1) for the bit periods of the words of the series of data frames and generates a digital data stream 332 based on the bit data values 122. The digital data stream 332 is representative of the digital logic levels in the series of data frames modulated using S-FSK to form the S-FSK waveform. The correlator circuit 328 receives the digital data stream 332 from the processing circuit 104, decodes the digital data stream 332 into code words, correlates the code words based on a predetermined protocol, and generates one or more intermediate control signals 334 based on the code words and the predetermined protocol. The keep alive circuit 330 receives the one or more intermediate control signals 334 from the correlator circuit 328, processes the one or more intermediate control signals 334 to generate one or more communication signals 336, and provides the one or more communication signals 336 at an output terminal.

Figure 4:
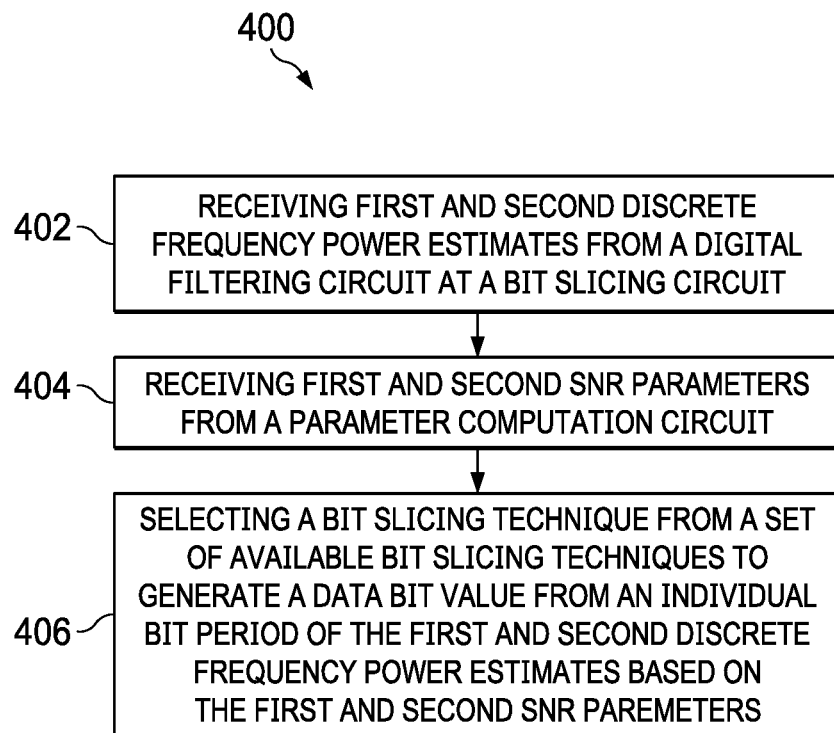
FIG. 4 is a flow chart of an example of a method for performing bit slicing in an S-FSK receiver.

With reference to FIG. 4, an example of a method 400 for performing bit slicing in an S-FSK receiver is disclosed. In several examples, the bit slicing circuit 102 of FIGS. 1-3 implements the method 400. In FIG. 4, the method 400 begins at 402 where first and second discrete frequency power estimates 106, 108 (see, e.g., FIG. 1) are received from a digital filtering circuit 110 at a bit slicing circuit 102. The first and second discrete frequency power estimates 106, 108 are based on an S-FSK waveform 112 received by an S-FSK receiver 114 associated with the bit slicing circuit 102. The first and second discrete frequency power estimates 106, 108 are representative of digital logic levels in a series of data frames modulated using S-FSK to form the S-FSK waveform 112. Each data frame including at least one word (e.g., data word(s) and/or zero energy word(s)). Each data word and zero energy word includes multiple bit periods. At 404 of FIG. 4, first and second SNR parameters 116, 118 (see, e.g., FIG. 1) are received from a parameter computation circuit 120 at the bit slicing circuit 102. The first and second SNR parameters 116, 118 represent a dynamic SNR for the respective first and second discrete frequency power estimates 106, 108 in relation to the series of data frames. At 406 of FIG. 4, a bit slicing technique is selected from a set of available bit slicing techniques to generate a data bit value 122 (see, e.g., FIG. 1) for an individual bit period of the first and second discrete frequency power estimates 106, 108 based on the first and second SNR parameters 116, 118.

Figure 5:
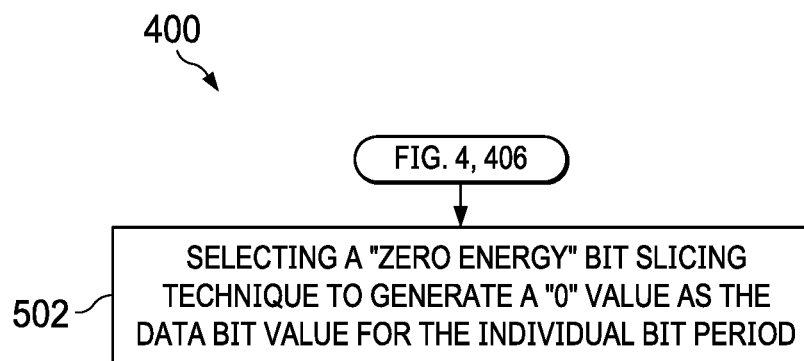
FIG. 5, in combination with FIG. 4, is a flow chart of another example of a method for performing bit slicing in an S-FSK receiver.

With reference to FIGS. 4 and 5, another example of the method 400, in conjunction with selecting the bit slicing technique in 406, also includes 502 where a "zero energy" bit slicing technique is selected to generate a "0" value as the data bit value 122 (see, e.g., FIG. 1) for the individual bit period based on the following criteria: i) a sum of the first and second SNR parameters 116, 118 is less than a first SNR threshold, ii) the first SNR parameter 116 is less than a second SNR threshold, and iii) the second SNR parameter 118 is less than the second SNR threshold. The second SNR threshold is less than the first SNR threshold.

Figure 6:
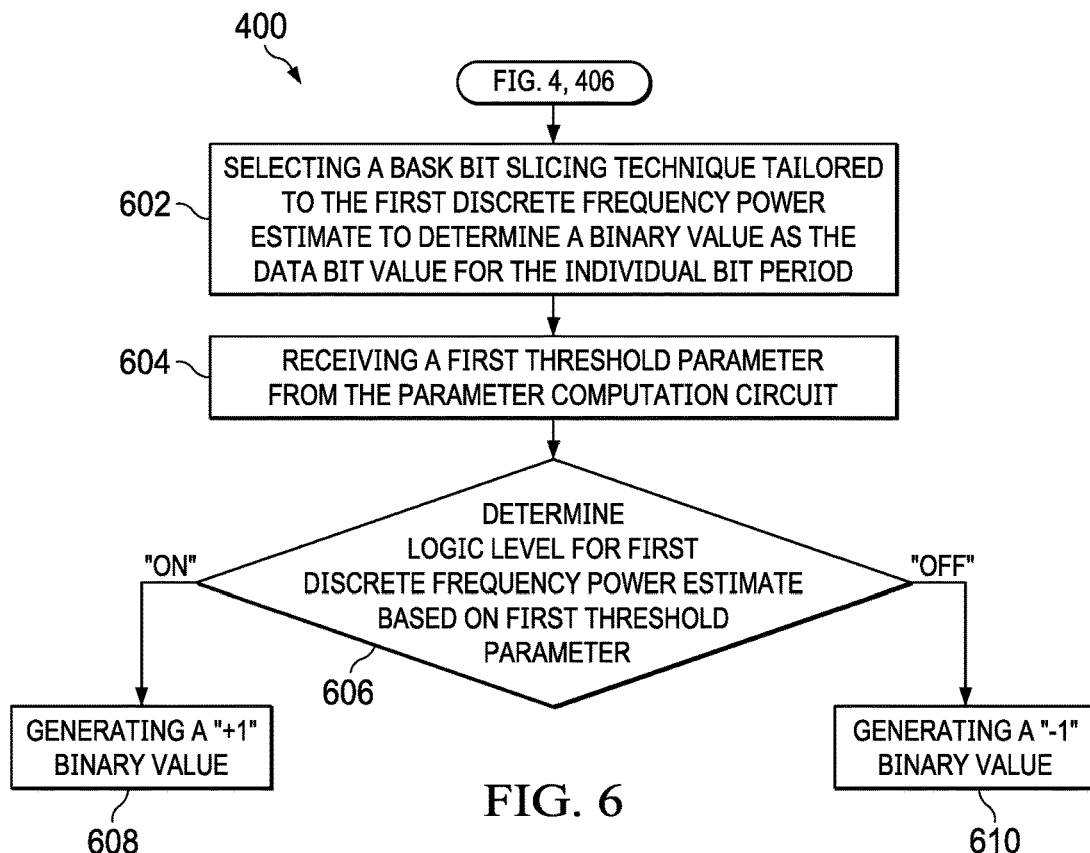
FIG. 6, in combination with FIG. 4, is a flow chart of yet another example of a method for performing bit slicing in an S-FSK receiver.

With reference to FIGS. 4 and 6, another example of the method 400, in conjunction with selecting the bit slicing technique in 406, also includes 602 where a binary amplitude-shift keying (BASK) bit slicing technique tailored to the first discrete frequency power estimate 106 (see, e.g., FIG. 1) is selected to generate a binary value as the data bit value 122 for the individual bit period based on the following criteria: i) the first SNR parameter 116 is greater than a second SNR threshold, ii) the second SNR parameter 118 is less than the second SNR threshold, and iii) a difference between the first and second SNR parameters 116, 118 is greater than a third SNR threshold. The third SNR threshold is less than the second SNR threshold.

With reference again to FIG. 6, a further example of the method 400 continues from 602 to 604 where a first threshold parameter (e.g., "mark" frequency threshold parameter) is received from the parameter computation circuit 120 (see, e.g., FIG. 1) at the bit slicing circuit 102. The first threshold parameter represents a dynamic threshold between "ON" and "OFF" logic levels for bit periods associated with the first discrete frequency power estimate 106 in relation to the series of data frames. At 606, the method 400, for example, determines the first discrete frequency power estimate 106 is at an "ON" logic level for the individual bit period where the first discrete frequency power estimate 106 is greater than the first threshold parameter. Next (608), after determining the first discrete frequency power estimate 106 is at the "ON" logic level, the method 400 generates a "+1" binary value as the data bit value 122 for the individual bit period.

With reference yet again to FIG. 6, another further example of the method 400 continues from 602 to 604 where a first threshold parameter is received from the parameter computation circuit 120 (see, e.g., FIG. 1) at the bit slicing circuit 102. The first threshold parameter represents a dynamic threshold between "ON" and "OFF" logic levels for bit periods associated with the first discrete frequency power estimate 106 in relation to the series of data frames. At 606, the method 400, for example, determines the first discrete frequency power estimate 106 is at an "OFF" logic level for the individual bit period where the first discrete frequency power estimate 106 is less than the first threshold parameter. Next, (610), after determining the first discrete frequency power estimate 106 is at the "OFF" logic level, the method 400 generates a "−1" binary value as the data bit value 122 for the individual bit period.

Figure 7:
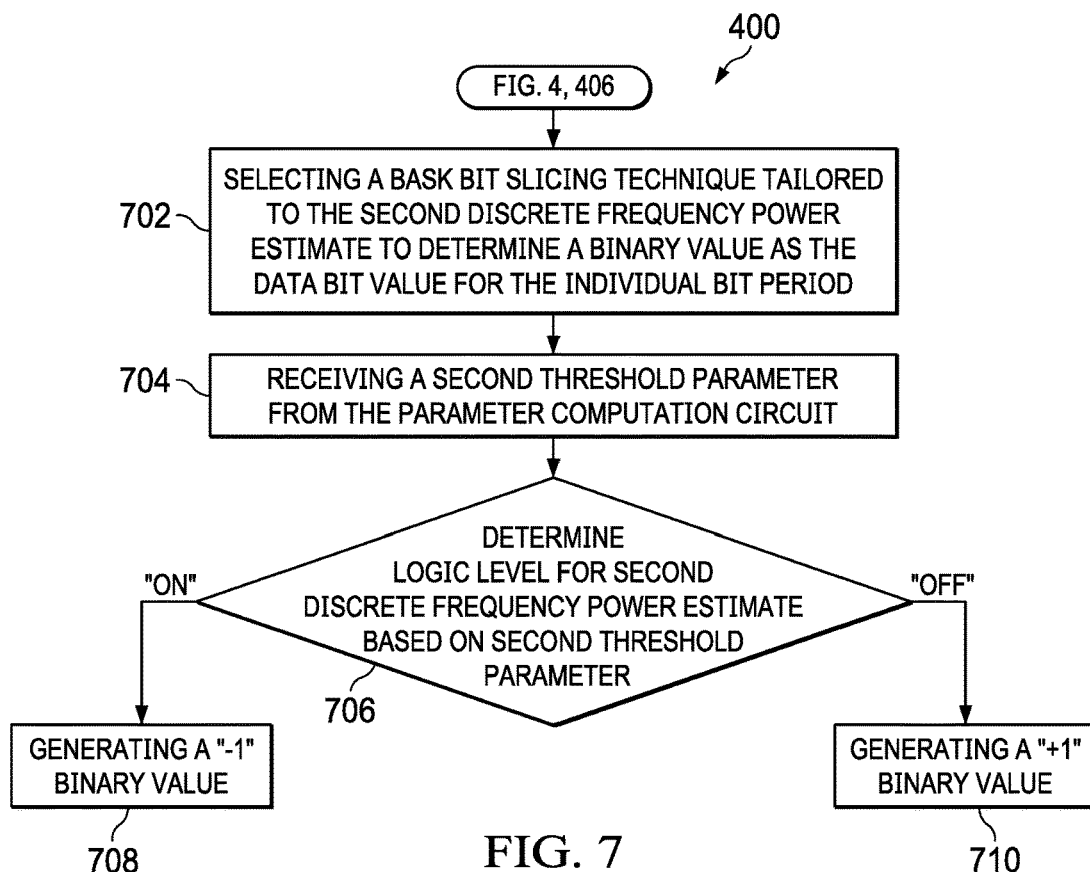
FIG. 7, in combination with FIG. 4, is a flow chart of still another example of a method for performing bit slicing in an S-FSK receiver.

With reference to FIGS. 4 and 7, yet another example of the method 400, in conjunction with selecting the bit slicing technique in 406, also includes 702 where a BASK bit slicing technique tailored to the second discrete frequency power estimate 108 (see, e.g., FIG. 1) is selected to generate the binary value as the data bit value 122 for the individual bit period based on the following criteria: i) the first SNR parameter 116 is less than a second SNR threshold, ii) the second SNR parameter 118 is greater than the second SNR threshold, and iii) a difference between the second and first SNR parameters 118, 116 is greater than a third SNR threshold. The third SNR threshold is less than the second SNR threshold.

With reference again to FIG. 7, a further example of the method 400 continues from 602 to 604 where a second threshold parameter (e.g., "space" frequency threshold parameter) is received from the parameter computation circuit 120 (see, e.g., FIG. 1) at the bit slicing circuit 102. The second threshold parameter represents a dynamic threshold between "ON" and "OFF" logic levels for bit periods associated with the second discrete frequency power estimate 108 in relation to the series of data frames. At 706, the method 400, for example, determines the second discrete frequency power estimate 108 is at an "ON" logic level for the individual bit period where the second discrete frequency power estimate 108 is greater than the second threshold parameter. Next (708), after determining the second discrete frequency power estimate 108 is at the "ON" logic level, the method 400 generates a "−1" binary value as the data bit value 122 for the individual bit period.

With reference yet again to FIG. 7, another further example of the method 400 continues from 602 to 604 where a second threshold parameter is received from the parameter computation circuit 120 (see, e.g., FIG. 1) at the bit slicing circuit 102. The second threshold parameter represents a dynamic threshold between "ON" and "OFF" logic levels for bit periods associated with the second discrete frequency power estimate 108 in relation to the series of data frames. At 706, the method 400, for example, determines the second discrete frequency power estimate 108 is at an "OFF" logic level for the individual bit period where the second discrete frequency power estimate 108 is less than the second threshold parameter. Next (710), after determining the second discrete frequency power estimate 108 is at the "OFF" logic level, the method 400 generates a "+1" binary value as the data bit value 122 for the individual bit period.

Figure 8:
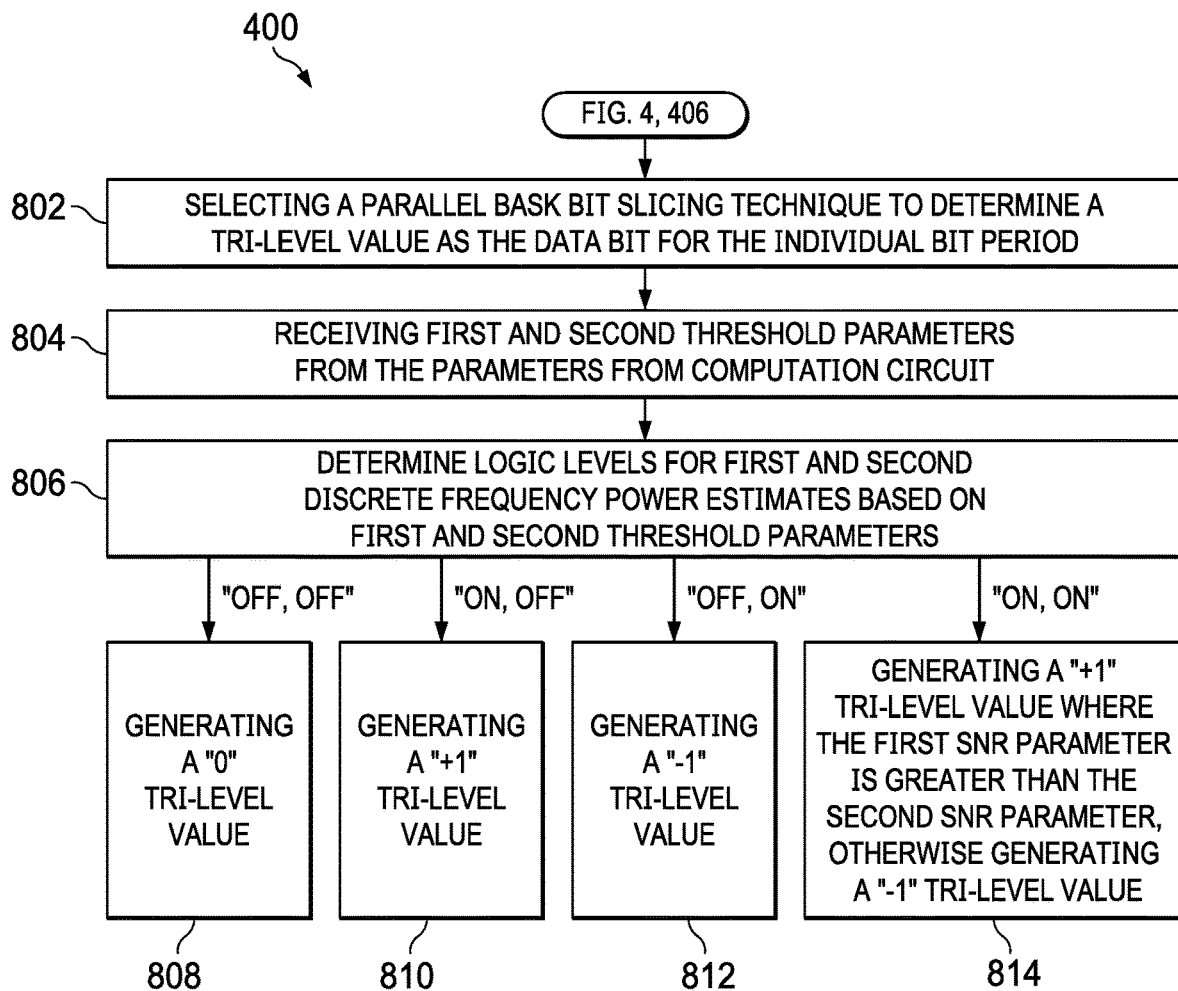
FIG. 8, in combination with FIG. 4, is a flow chart of still yet another example of a method for performing bit slicing in an S-FSK receiver.
Figure 14:
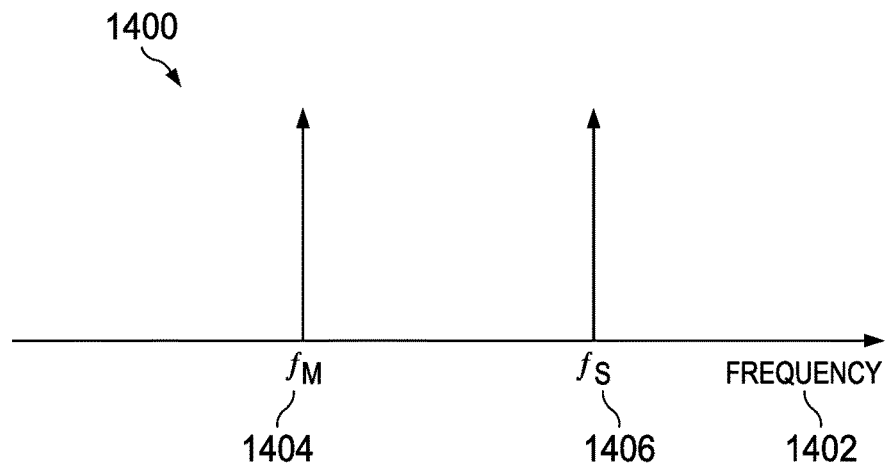
FIG. 14 is a frequency spectrum diagram showing "mark" ($f_M$) and "space" ($f_S$) frequencies.

With reference to FIGS. 4 and 8, still another example of the method 400, in conjunction with selecting the bit slicing technique in 406, also includes 802 where a parallel BASK bit slicing technique is selected to generate a tri-level value as the data bit value 122 (see, e.g., FIG. 1) for the individual bit period based on the following criteria:

a. i) a sum of the first and second SNR parameters 116, 118 is less than a first SNR threshold, ii) the first SNR parameter 116 or the second SNR parameter 118 is greater than a second SNR threshold, iii) a difference between the second and first SNR parameters 118, 116 is less than a third SNR threshold, and iv) a difference between the first and second SNR parameters (116, 118) is less than the third SNR threshold, the second SNR threshold being less than the first SNR threshold and greater than the third SNR threshold; or b. i) a difference between the second and first SNR parameters 118, 116 is less than the third SNR threshold, ii) a difference between the first and second SNR parameters 116, 118 is less than the third SNR threshold, and iii) a sum of the first and second SNR parameters 116, 118 is greater than the first SNR threshold; or c. i) the first SNR parameter 116 is greater than the second SNR threshold and ii) the second SNR parameter 118 is greater than the second SNR threshold.

With reference again to FIG. 8, a further example of the method continues from 802 to 804 wherein first and second threshold parameters (e.g., "mark" and "space" frequency threshold parameters) are received from the parameter computation circuit 120 (see, e.g., FIG. 1) at the bit slicing circuit 102. The first and second threshold parameters represent dynamic thresholds between "ON" and "OFF" logic levels for bit periods associated with the respective first and second discrete frequency power estimates 106, 108 in relation to the series of data frames. At 806, the method 400, for example, determines the first discrete frequency power estimate 106 is at an "OFF" logic level for the individual bit period where the first discrete frequency power estimate 106 is less than the first threshold parameter and determines the second discrete frequency power estimate 108 is at an "OFF" logic level for the individual bit period where the second discrete frequency power estimate 108 is less than the second threshold parameter. Next (808), after determining the first and second discrete frequency power estimates 106, 108 are at "OFF" logic levels, the method 400 generates a "0" tri-level value as the data bit value 122 for the individual bit period.

With reference yet again to FIG. 8, another further example of the method 400 continues from 802 to 804 where first and second threshold parameters are received from the parameter computation circuit 120 (see, e.g., FIG. 1) at the bit slicing circuit 102. The first and second threshold parameters represent dynamic thresholds between "ON" and "OFF" logic levels for bit periods associated with the respective first and second discrete frequency power estimates 106, 108 in relation to the series of data frames. At 806, the method 400, for example, determines the first discrete frequency power estimate 106 is at an "ON" logic level for the individual bit period where the first discrete frequency power estimate 106 is greater than the first threshold parameter and determines the second discrete frequency power estimate 108 is at an "OFF" logic level for the individual bit period where the second discrete frequency power estimate 108 is less than the second threshold parameter. Next (810), after determining the first discrete frequency power estimate 106 is at an "ON" logic level and the second discrete frequency power estimate 108 is at an "OFF" logic level, the method 400 generates a "+1" tri-level value as the data bit value 122 for the individual bit period.

With reference still again to FIG. 8, yet another further example of the method 400 continues from 802 to 804 where first and second threshold parameters are received from the parameter computation circuit 120 (see, e.g., FIG. 1) at the bit slicing circuit 102. The first and second threshold parameters represent dynamic thresholds between "ON" and "OFF" logic levels for bit periods associated with the respective first and second discrete frequency power estimates 106, 108 in relation to the series of data frames. At 806, the method 400, for example, determines the first discrete frequency power estimate 106 is at an "OFF" logic level for the individual bit period where the first discrete frequency power estimate 106 is less than the first threshold parameter and determines the second discrete frequency power estimate 108 is at an "ON" logic level for the individual bit period where the second discrete frequency power estimate 108 is greater than the second threshold parameter. Next (812), after determining the first discrete frequency power estimate 106 is at an "OFF" logic level and the second discrete frequency power estimate 108 is at an "ON" logic level, the method 400 generates a "−1" tri-level value as the data bit value 122 for the individual bit period.

With reference still yet again to FIG. 8, still another further example of the method 400 continues from 802 to 804 where first and second threshold parameters are received from the parameter computation circuit 120 (see, e.g., FIG. 1) at the bit slicing circuit 102. The first and second threshold parameters represent dynamic thresholds between "ON" and "OFF" logic levels for bit periods associated with the respective first and second discrete frequency power estimates 106, 108 in relation to the series of data frames. At 806, the method 400, for example, determines the first discrete frequency power estimate 106 is at an "ON" logic level for the individual bit period where the first discrete frequency power estimate 106 is greater than the first threshold parameter and determines the second discrete frequency power estimate 108 is at an "ON" logic level for the individual bit period where the second discrete frequency power estimate 108 is greater than the second threshold parameter. Next (814), after determining both first and second discrete frequency power estimates 106, 108 are at "ON" logic levels, the method 400 generates a "+1" tri-level value as the data bit value 122 for the individual bit period where the first SNR parameter 116 is greater than the second SNR parameter 118, otherwise the method 400 generates a "−1" tri-level value as the data bit value 122 for the individual bit period. In a further example of the method 400, two-level data bits are generated from the tri-level sliced output by averaging or correlating with an outer code.

Figure 9:
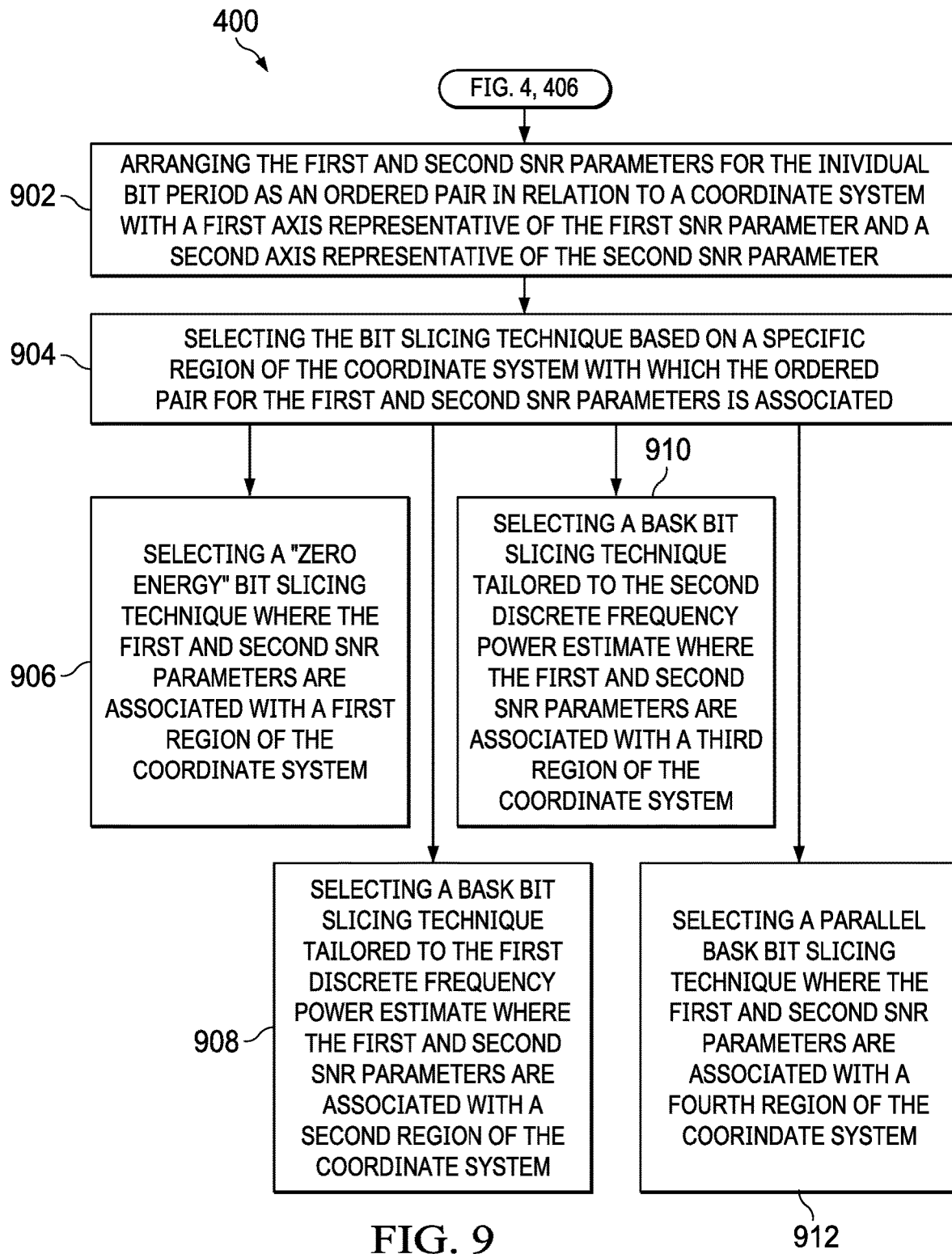
FIG. 9, in combination with FIG. 4, is a flow chart of another example of a method for performing bit slicing in an S-FSK receiver.

With reference to FIGS. 4 and 9, still yet another example of the method 400 continues from 406 to 902 where the first and second SNR parameters 116, 118 (see, e.g., FIG. 1) for the individual bit period are arranged as an ordered pair in relation to a coordinate system 1200 (see, e.g., FIG. 12) with a first axis 1202 representative of the first SNR parameter 116 and a second axis 1204 representative of the second SNR parameter 118. The coordinate system 1200 uses predetermined SNR thresholds (e.g., TH1 1206, TH2 1208, TH3 1210) to define regions (e.g., Region 1 1212, Region 2 1214, Region 3 1216, Region 4 1218) within the coordinate system 1200 representative of alternate bit slicing techniques from the set of available bit slicing techniques. At 904 of FIG. 9, the bit slicing technique is selected based on a specific region of the coordinate system 1200 with which the ordered pair for the first and second SNR parameters 116, 118 is associated.

With continued reference to FIG. 9, a further example of the method 400 continues from 904 to 906 where, in conjunction with selecting the bit slicing technique in 904, a "zero energy" bit slicing technique is selected to generate a "0" value as the data bit value 122 (see, e.g., FIG. 1) for the individual bit period where the first and second SNR parameters 116, 118 are associated with a first region 1212 (see, e.g., FIG. 12) of the coordinate system 1200.

In an even further example of the method 400, in conjunction with selecting the "zero energy" bit slicing technique in 906, the "zero energy" bit slicing technique is selected based on the following criteria: i) a sum of the first and second SNR parameters 116, 118 is less than a first SNR threshold (TH1) 1206 (see, e.g., FIG. 12), ii) the first SNR parameter 116 is less than a second SNR threshold (TH2) 1208, and iii) the second SNR parameter 118 is less than the second SNR threshold 1208. The second SNR threshold 1208 is less than the first SNR threshold 1206.

Figure 10:
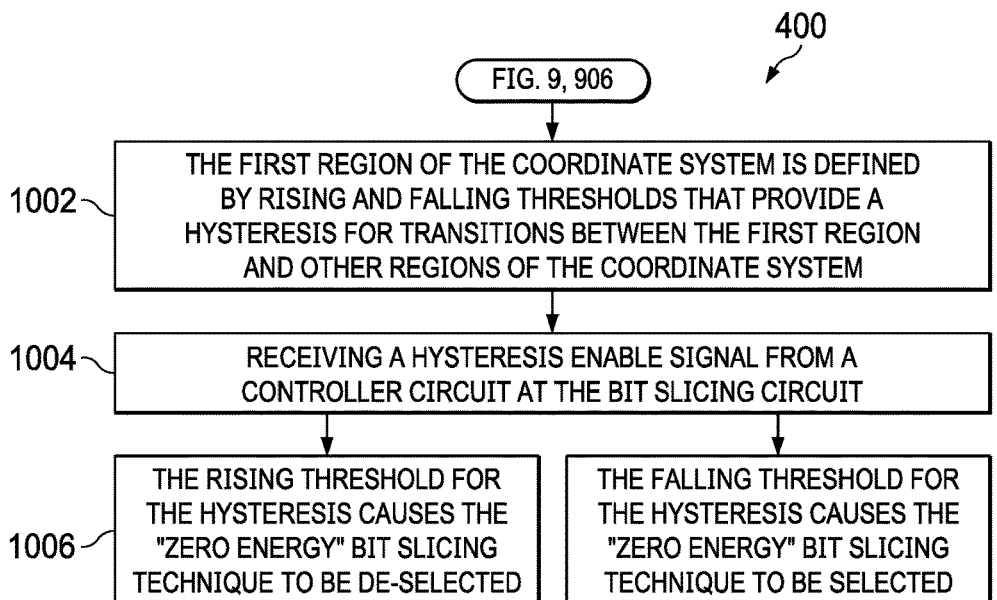
FIG. 10, in combination with FIGS. 4 and 9, is a flow chart of yet another example of a method for performing bit slicing in an S-FSK receiver.

With reference to FIGS. 9 and 10, another even further example of the method 400 continues from 906 to 1002 where the first region 1212 (see, e.g., FIG. 13) of the coordinate system 1200 is defined by rising and falling thresholds 1320, 1322 that provide a hysteresis for transitions between the first region 1212 and other regions of the coordinate system 1200 based on the first and second SNR parameters 116, 118 (see, e.g., FIG. 1) in relation to the series of data frames. At 1004 of FIG. 10, a hysteresis enable signal 124 is received from a controller circuit 126 at the bit slicing circuit 102. The hysteresis enable signal 124 activates use of the rising and falling thresholds 1320, 1322. At 1006 of FIG. 10, for example, the rising threshold 1320 for the hysteresis causes the "zero energy" bit slicing technique to be de-selected based on the following criteria: i) the sum of the first and second SNR parameters 116, 118 is rising in relation to a preceding sum and becomes greater than a first SNR threshold (TH1) 1206, ii) the first SNR parameter 116 is rising in relation to a preceding value for the first SNR parameter 116 and becomes greater than a second SNR threshold (TH2) 1208, and iii) the second SNR parameter 118 is rising in relation to a preceding value for the second SNR parameter 118 and becomes greater than the second SNR threshold 1208. The second SNR threshold 1208 is less than the first SNR threshold 1206. At 1008 of FIG. 10, for example, the falling threshold 1322 for the hysteresis causes the "zero energy" bit slicing technique to be selected based on the following criteria: i) the sum of the first and second SNR parameters 116, 118 is falling in relation to a preceding sum and becomes less than a fourth SNR threshold (TH4)

1324, ii) the first SNR parameter 116 is falling in relation to the preceding value for the first SNR parameter 116 and becomes less than a fifth SNR threshold (TH5) 1324, and iii) the second SNR parameter 118 is falling in relation to the preceding value for the second SNR parameter 118 and becomes less than the fifth SNR threshold 1324. The fifth SNR threshold 1324 is less than the fourth SNR threshold 1322. The fifth SNR threshold 1324 is less than the second SNR threshold 1208 and the fourth SNR threshold 1322 is less than the first SNR threshold 1206.

Figure 12:
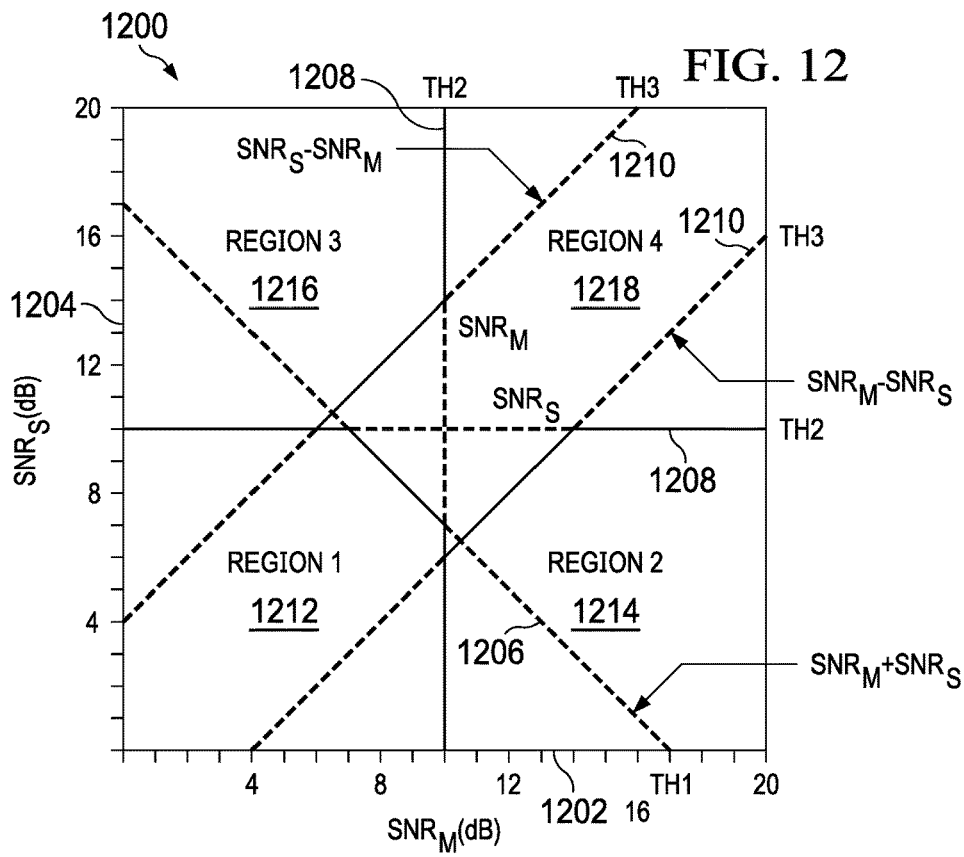
FIG. 12 is an example of a coordinate system used for selecting a bit slicing technique from a set of available techniques.
Figure 13:
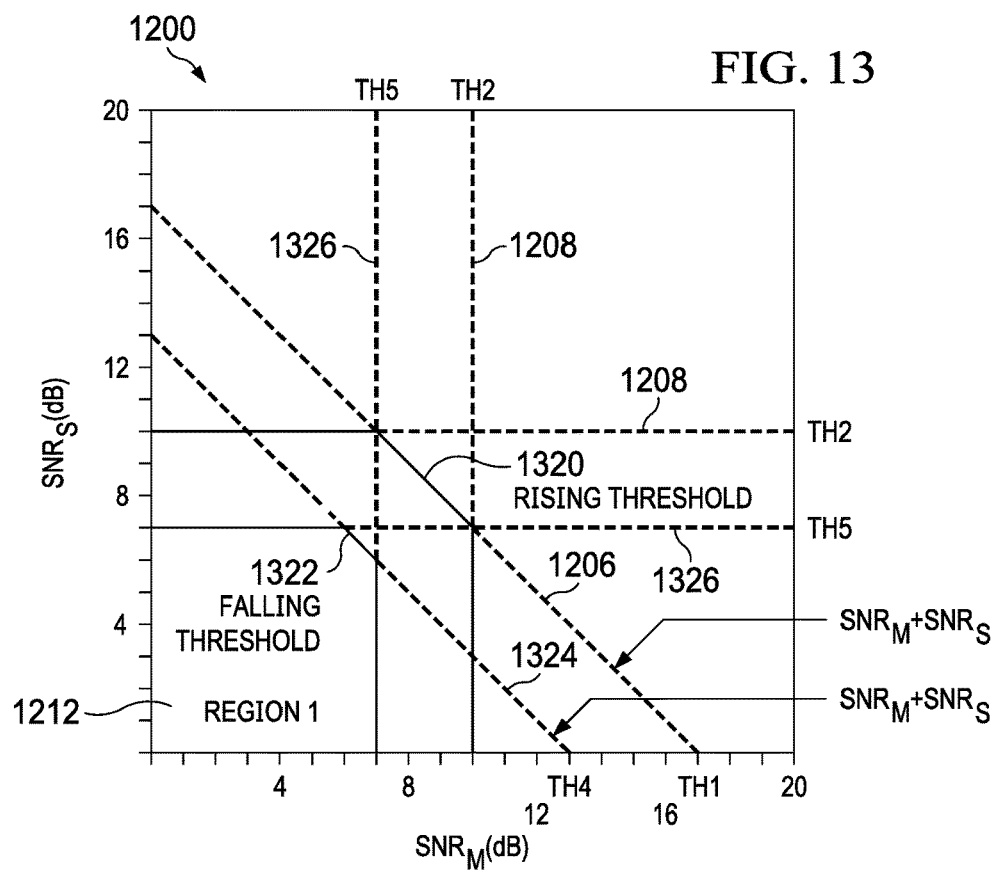
FIG. 13 is an example of a coordinate system showing use of a hysteresis in relation to selecting a bit slicing technique from a set of available techniques.

Notably, FIG. 13 shows a rising threshold 1320 for the hysteresis that is the region 1 1212 boundary of FIG. 12. In other example, the rising and falling thresholds 1320, 1322 of FIG. 13 may be respectively above and below the region 1 1212 boundary of FIG. 12. In other words, the region 1 1212 boundary may be between the rising and filing thresholds 1320, 1322 hysteresis.

With reference again to FIG. 9, another further example of the method 400 continues from 904 to 908 where, in conjunction with selecting the bit slicing technique in 904, a BASK bit slicing technique tailored to the first discrete frequency power estimate 106 (see, e.g., FIG. 1) is selected to generate a binary value as the data bit value 122 for the individual bit period where the first and second SNR parameters 116, 118 are associated with a second region 1214 (see FIG. 12) of the coordinate system 1200.

In an even further example of the method 400, in conjunction with selecting the BASK bit slicing technique in 908, the BASK bit slicing technique is selected to generate the data bit value 122 (see, e.g., FIG. 1) for the individual bit period based on the following criteria: i) the first SNR parameter 116 is greater than a second SNR threshold (TH2) 1208 (see, e.g., FIG. 12), ii) the second SNR parameter 118 is less than the second SNR threshold 1208, and iii) a difference between the first and second SNR parameters is greater than a third SNR threshold (TH3) 1210. The third SNR threshold 1210 is less than the second SNR threshold 1208.

With further reference again to FIG. 9, another further example of the method 400 continues from 904 to 910 where, in conjunction with selecting the bit slicing technique in 904, a BASK bit slicing technique tailored to the second discrete frequency power estimate 108 (see, e.g., FIG. 1) is selected to generate a binary value as the data bit value 122 for the individual bit period where the first and second SNR parameters 116, 118 are associated with a third region 1216 (see FIG. 12) of the coordinate system 1200.

In an even further example of the method 400, in conjunction with selecting the BASK bit slicing technique in 910, the BASK bit slicing technique is selected to generate the data bit value 122 (see, e.g., FIG. 1) for the individual bit period based on the following criteria: i) the first SNR parameter 116 is less than a second SNR threshold (TH2) 1208 (see, e.g., FIG. 12), ii) the second SNR parameter 118 is greater than the second SNR threshold 1208, and iii) a difference between the second and first SNR parameters 118, 116 is greater than a third SNR threshold (TH3) 1210. The third SNR threshold 1210 is less than the second SNR threshold 1208.

With further reference again to FIG. 9, another further example of the method 400 continues from 904 to 912 where, in conjunction with selecting the bit slicing technique in 904, a parallel BASK bit slicing technique is selected to generate a tri-level value as the data bit value 122 (see, e.g., FIG. 1) for the individual bit period where the first and second SNR parameters 116, 118 are associated with a fourth region 1218 (see, FIG. 12) of the coordinate system 1200.

In an even further example of the method 400, in conjunction with selecting the parallel BASK bit slicing technique in 912, the parallel BASK bit slicing technique is selected to generate the data bit value 122 (see, e.g., FIG. 1) for the individual bit period based on the following criteria:

a. i) a sum of the first and second SNR parameters 116, 118 is less than a first SNR threshold (TH1) 1206 (see, e.g., FIG. 12), ii) the first SNR parameter 116 or the second SNR parameter 118 is greater than a second SNR threshold (TH2) 1208, iii) a difference between the second and first SNR parameters 118, 116 is less than a third SNR threshold (TH3) 1210, and iv) a difference between the first and second SNR parameters 116, 118 is less than the third SNR threshold 1210, the second SNR threshold 1208 being less than the first SNR threshold 1206 and greater than the third SNR threshold 1210; or b. i) a difference between the second and first SNR parameters 118, 116 is less than the third SNR threshold 1210, ii) a difference between the first and second SNR parameters 116, 118 is less than the third SNR threshold 1210, and iii) a sum of the first and second SNR parameters 116, 118 is greater than the first SNR threshold 1206; or c. i) the first SNR parameter 116 is greater than the second SNR threshold 1208 and ii) the second SNR parameter 118 is greater than the second SNR threshold 1208.

Figure 11:
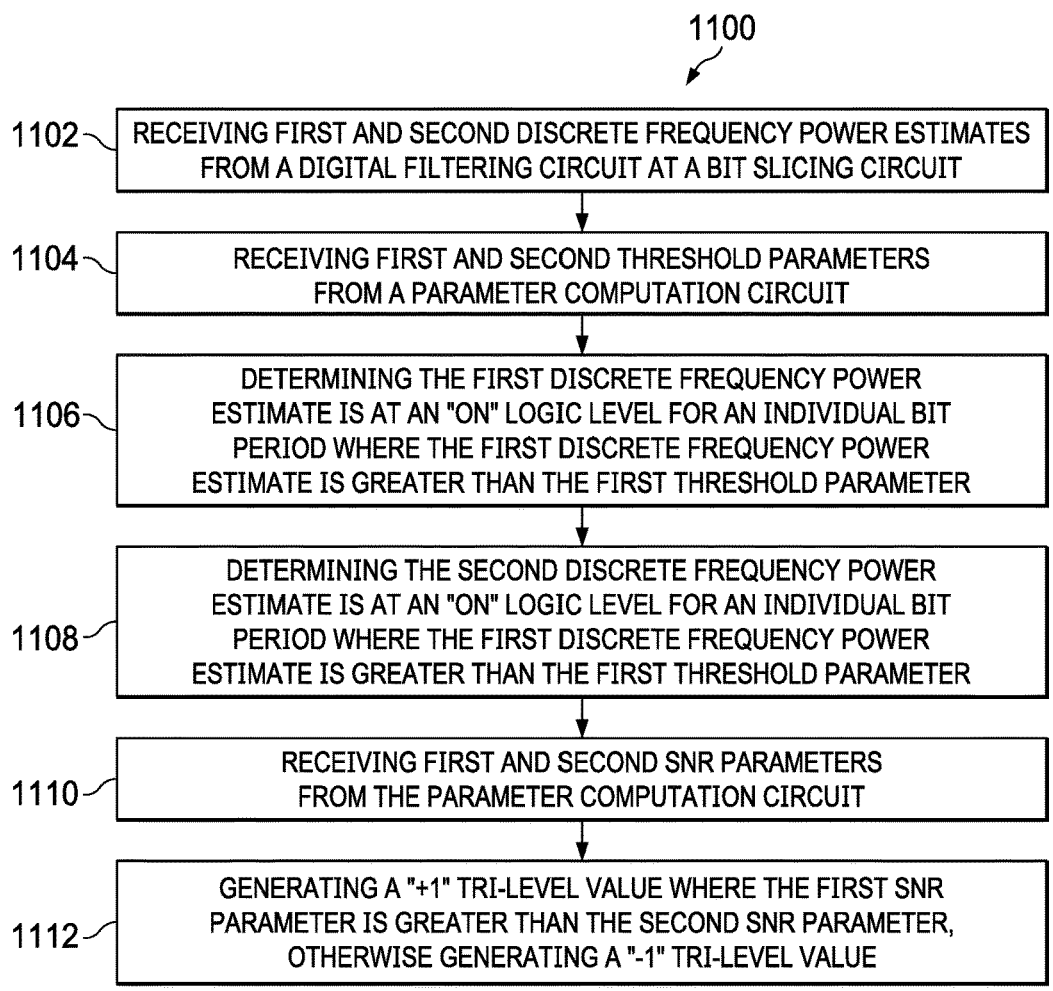
FIG. 11 is a flow chart of still another example of a method for performing bit slicing in an S-FSK receiver.

With reference to FIG. 11, another example of a method 1100 for performing bit slicing in an S-FSK receiver is disclosed. In several examples, the bit slicing circuit 102 of FIGS. 1-3 implements the method 1100. In FIG. 11, the method 1100 begins at 1102 where first and second discrete frequency power estimates 106, 108 (see, e.g., FIG. 1) are received from a digital filtering circuit 110 at a bit slicing circuit 102. The first and second discrete frequency power estimates 106, 108 are based on an S-FSK waveform 112 received by an S-FSK receiver 114 associated with the bit slicing circuit 102. The first and second discrete frequency power estimates 106, 108 are representative of digital logic levels in a series of data frames modulated using S-FSK to form the S-FSK waveform 112. Each data frame including at least one word (e.g., data word(s) and/or zero energy word(s)). Each data word and zero energy word includes multiple bit periods. At 1104 of FIG. 11, first and second threshold parameters (e.g., "mark" and "space" threshold parameters) are received from a parameter computation circuit 120 at the bit slicing circuit 102. The first and second threshold parameters represent dynamic thresholds between "ON" and "OFF" logic levels for bit periods associated with the respective first and second discrete frequency power estimates 106, 108 in relation to the series of data frames. At 1106, the method 1110 determines the first discrete frequency power estimate 106 is at an "ON" logic level for an individual bit period where the first discrete frequency power estimate 106 is greater than the first threshold parameter. At 1108, the method 1100 determines the second discrete frequency power estimate 118 is at an "ON" logic level for the individual bit period where the second discrete frequency power estimate 108 is greater than the second threshold parameter. At 1110, first and second SNR parameters 116, 118 are received from the parameter computation circuit 120 at the bit slicing circuit 102. The first and second SNR parameters 116, 118 represent a dynamic SNR for the respective first and second discrete frequency power estimates 106, 108 in relation to the series of data frames. Next (1112), after determining both first and second discrete frequency power estimates 106, 108 are at "ON" logic levels, the method 1100 generates a "+1" tri-level value as a data bit value 122 for an individual bit period of the first and second discrete frequency power estimates 106, 108 where the first SNR parameter 116 is greater than the second SNR parameter 118, otherwise the method 1100 generates a "−1" tri-level value as the data bit value 122 for the individual bit period. In a further example of the method 1100, two-level data bits are generated from the tri-level sliced output by averaging or correlating with an outer code.

In another example, the method 1100 also includes selecting a parallel BASK bit slicing technique to generate the tri-level value as the data bit value 122 (see, e.g., FIG. 1) for the individual bit period where:

a. i) a sum of the first and second SNR parameters 116, 118 is less than a first SNR threshold, ii) the first SNR parameter 116 or the second SNR parameter 118 is greater than the second SNR threshold, iii) a difference between the second and first SNR parameters 118, 116 is less than a third SNR threshold, and iv) a difference between the first and second SNR parameters 116, 118 is less than the third SNR threshold, the second SNR threshold being less than the first SNR threshold and greater than the third SNR threshold; or b. i) a difference between the second and first SNR parameters 118, 116 is less than the third SNR threshold, ii) a difference between the first and second SNR parameters 116, 118 is less than the third SNR threshold, and iii) a sum of the first and second SNR parameters 116, 118 is greater than the first SNR threshold; or c. i) the first SNR parameter 116 is greater than the second SNR threshold and ii) the second SNR parameter 118 is greater than the second SNR threshold.

In yet another example, the method 1100 also includes selecting a bit slicing technique from a set of available bit slicing techniques to generate the data bit value 122 (see, e.g., FIG. 1) for the individual bit period based on the first and second SNR parameters 116, 118.

In a further example, the method 1100 also includes arranging the first and second SNR parameters 116, 118 (see, e.g., FIG. 1) for the individual bit period as an ordered pair in relation to a coordinate system 1200 (see, e.g., FIG. 12) with a first axis 1202 representative of the first SNR parameter 116 and a second axis 1204 representative of the second SNR parameter 118. The coordinate system 1200 uses predetermined SNR thresholds (e.g., TH1 1206, TH2 1208, TH3 1210) to define regions (e.g., Region 1 1212, Region 2 1214, Region 3 1216, Region 4 1218) within the coordinate system 1200 representative of alternate bit slicing techniques from the set of available bit slicing techniques. Next, the method 1100 selects the bit slicing technique based on a specific region of the coordinate system 1200 with which the ordered pair for the first and second SNR parameters 116, 118 is associated.

In an even further example of the method 1100, a first region 1212 (see, e.g., FIG. 13) of the coordinate system 1200 is defined by rising and falling thresholds 1320, 1322 that provide a hysteresis for transitions between the first region 1212 and other regions of the coordinate system 1200 based on the first and second SNR parameters 116, 118 (see, e.g., FIG. 1) in relation to the series of data frames. In this example, the method 1100 also includes receiving a hysteresis enable signal 124 from a controller circuit 126 at the bit slicing circuit 102. The hysteresis enable signal 124 activates use of the rising and falling thresholds 1320, 1322. The rising threshold 1320 for the hysteresis causes the "zero energy" bit slicing technique to be de-selected based on the following criteria: i) the sum of the first and second SNR parameters 116, 118 is rising in relation to a preceding sum and becomes greater than a first SNR threshold (TH1) 1206, ii) the first SNR parameter 116 is rising in relation to a preceding value for the first SNR parameter 116 and becomes greater than a second SNR threshold (TH2) 1208, and iii) the second SNR parameter 118 is rising in relation to a preceding value for the second SNR parameter 118 and becomes greater than the second SNR threshold 1208. The second SNR threshold 1208 is less than the first SNR threshold 1206. The falling threshold 1322 for the hysteresis causes the "zero energy" bit slicing technique to be selected based on the following criteria: i) the sum of the first and second SNR parameters 116, 118 is falling in relation to a preceding sum and becomes less than a fourth SNR threshold (TH4) 1324, ii) the first SNR parameter 116 is falling in relation to the preceding value for the first SNR parameter 116 and becomes less than a fifth SNR threshold (TH5) 1326, and iii) the second SNR parameter 118 is falling in relation to the preceding value for the second SNR parameter 118 and becomes less than the fifth SNR threshold 1326. The fifth SNR threshold 1326 is less than the fourth SNR threshold 1324. The fifth SNR threshold 1326 is less than the second SNR threshold 1208 and the fourth SNR threshold 1324 is less than the first SNR threshold 1206.

In another even further example, the method 1100 also includes selecting a parallel BASK bit slicing technique to generate the tri-level value as the data bit value 122 (see, e.g., FIG. 1) for the individual bit period where the first and second SNR parameters 116, 118 are associated with a fourth region 1218 (see FIG. 12) of the coordinate system 1200.

In a still even further example, in conjunction with selecting the parallel BASK bit slicing technique, the method 1100 also includes selecting the parallel BASK bit slicing technique to generate the data bit value 122 (see, e.g., FIG. 1) for the individual bit period based on the following criteria:

a. i) a sum of the first and second SNR parameters 116, 118 is less than a first SNR threshold (TH1) 1206 (see, e.g., FIG. 12), ii) the first SNR parameter 116 or the second SNR parameter 118 is greater than a second SNR threshold (TH2) 1208, iii) a difference between the second and first SNR parameters 118, 116 is less than a third SNR threshold (TH3) 1210, and iv) a difference between the first and second SNR parameters 116, 118 is less than the third SNR threshold 1210, the second SNR threshold 1208 being less than the first SNR threshold 1206 and greater than the third SNR threshold 1210; or b. i) a difference between the second and first SNR parameters 118, 116 is less than the third SNR threshold 1210, ii) a difference between the first and second SNR parameters 116, 118 is less than the third SNR threshold 1210, and iii) a sum of the first and second SNR parameters 116, 118 is greater than the first SNR threshold 1206; or c. i) the first SNR parameter 116 is greater than the second SNR threshold 1208 and ii) the second SNR parameter 118 is greater than the second SNR threshold 1208.

Figure 15:
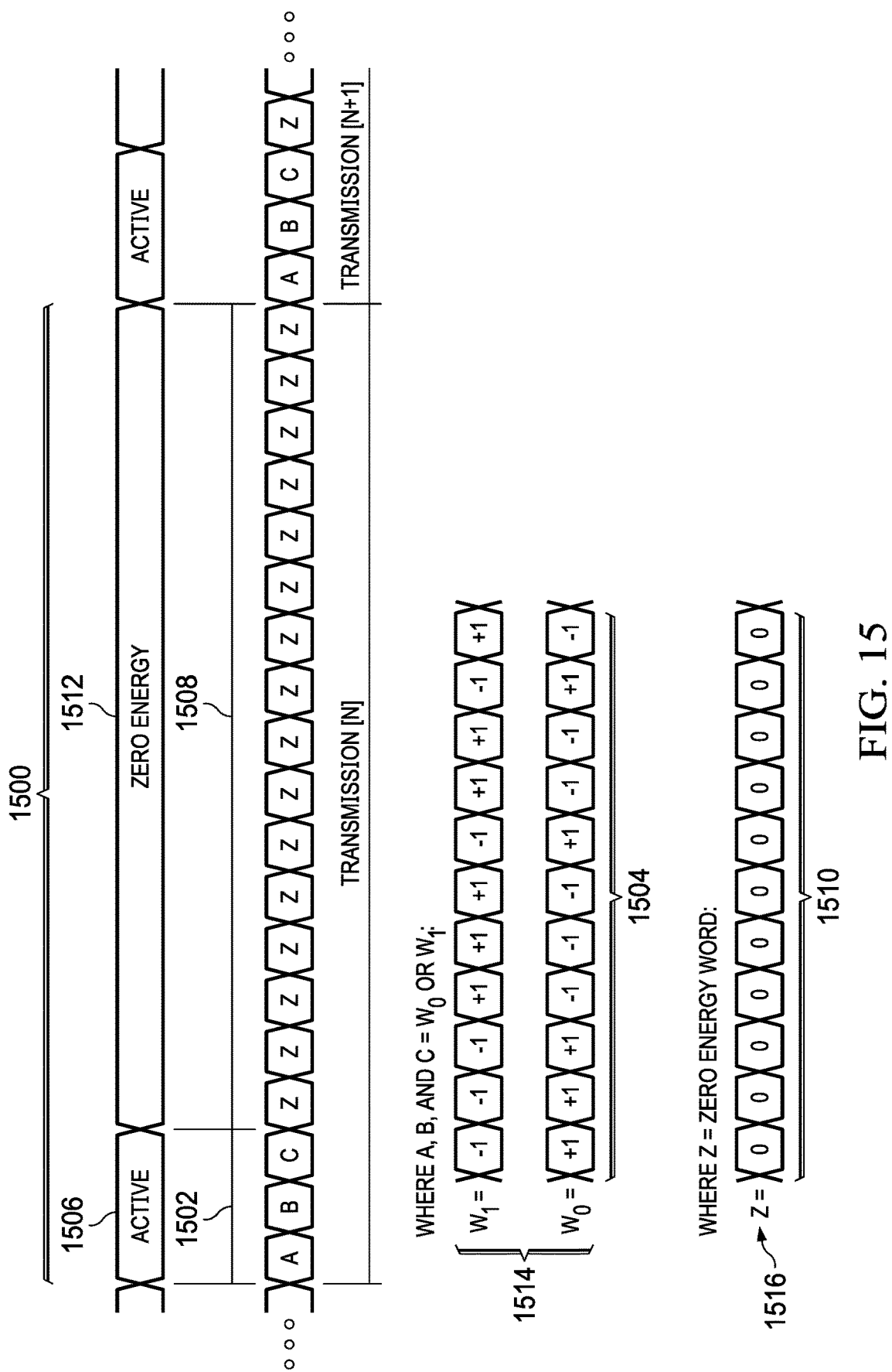
FIG. 15 is a diagram of an example of an S-FSK communication frame, code words, and zero energy words.

With reference again to FIG. 15, in accordance with the SunSpec Interoperability Specification, an S-FSK frame consists of three words with 11-bit periods during an active portion and 16 words with 11-bit periods during a zero energy portion. During the active portion, each word includes approximately 50% +1's and approximately 50% −1's. For example, five or six bits that are +1's and six or five bits that are −1's. During the zero energy portion, each word includes 11 bits that are all 0's.

On the individual "mark" and "space" frequency signals, this means per frame:

3×11×0.5~16 ones; and

3×11×0.5+16×11×1~192 zeros (e.g., 12× more zeros than ones).

Figure 16:
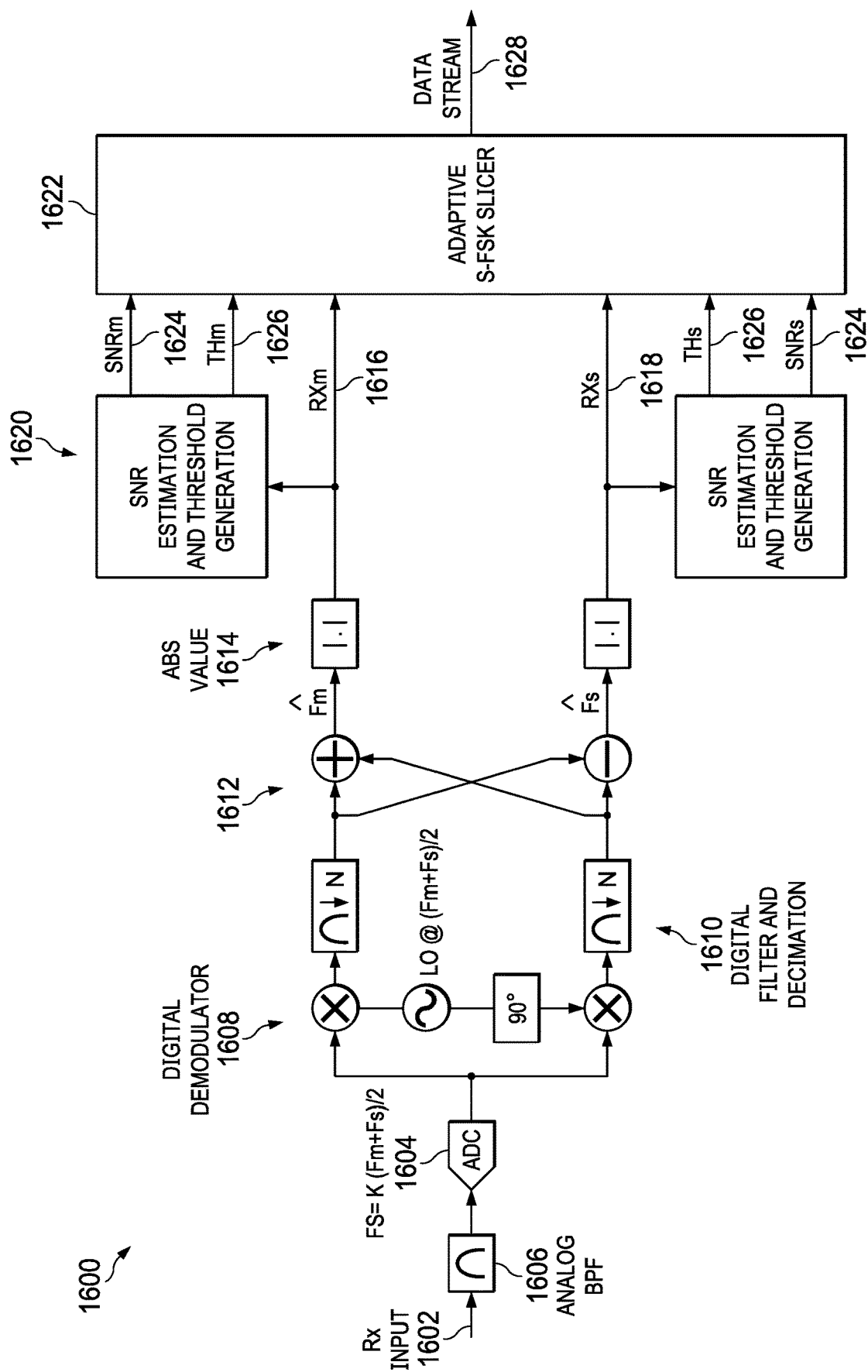
FIG. 16 is a block diagram of an example of an S-FSK receiver architecture.

With reference to FIG. 16, an example of an architecture for an S-FSK receiver is disclosed. A received signal 1602 is digitized by an ADC 1604 after analog band-pass and anti-aliasing filtering 1606. The digital stream is mixed 1608 with quadrature tones of frequency (Fm+Fs)/2 to produce two digital streams in which the components at Fm and Fs are at both (Fs−Fm)/2 and −(Fs−Fm)/2. After complex narrow-band digital filtering and decimation 1610, the components at Fm and Fs are extracted by combining 1612 the two complex streams in-phase and out-of-phase. The "abs value" function 1614 is used as an approximation for the power estimate at the Fm and Fs tones. Thus, the power estimates RXm 1616 and RXs 1618 represent a running estimate of the power of the transmitted signal at Fm and Fs frequencies. SNRs of the two streams are estimated and slicing thresholds are generated 1620. The adaptive S-FSK slicer uses the RXm 1616 and RXs 1618 power estimates along with the SNRs 1624 and thresholds 1626 to come up with the output data stream 1628.

In one example, the SNR is estimated as the difference of "On Power" and "Off Power" for each channel:

SNR=On_Power−Off_Power

Where "On Power" is the envelope of the RX power estimate on the higher end of the amplitude range and occurs where there is active transmission on that tone. Likewise, "Off Power" is the envelope of the RX power estimate on the lower end of the amplitude range and occurs where there is transmission on the complementary tone and during periods of zero energy. "Off Power" may not be zero due to presence of in-band interference.

Slicing thresholds can be chosen in between the "On Power" and "Off Power" for each channel. In one example, the thresholds are based on the following equation:

TH=(On_Power+Off_Power)/2

For example, an FSK demodulator slices using the following logic:

If (RXm>RXs)
D=1
Else
D=0

Where D is the slicer output, RXm is the received "mark" power estimate, and RXs is the received "space" power estimate. However, this technique may perform poorly if one of the channels has interference.

In one example, a binary OOK demodulator treats the input as two binary on-off keyed (B-OOK) channels and use data from the channel with the higher SNR as shown in the following logic:

If (RXm>THm)
Dm=1
Else
Dm=0
If (RXs>THs)
Ds=0
Else
Ds=1
If (SNRm>SNRs)
D=Dm
Else
D=Ds Where D is the slicer output, RXm is the received "mark" power estimate, THm is the "mark" slicing threshold, RXs is the received "space" power estimate, THs is the "space" slicing threshold, SNRm is the SNR for the "mark" power estimate, and SNRs is the SNR for the "space" power estimate. This would give poor performance if no channels have interference.

In one example, the S-FSK slicer 1622 of FIG. 16 uses tri-level detection of data bit values for individual bit period via parallel BASK on the received "mark" and "space" power estimates 1616, 1618. Slicing the received "mark" and "space" power estimates independently will result in combinations of "mark" and "space" [M,S] data bit values [0,0], [0,1], [1,0], and [1,1], where [0,0]="0" tri-level value; [0,1]="−1" tri-level value, [1,0]="+1" tri-level value, and [1,1] results in an error condition because there is no corresponding tri-level value in the alphabet. In one example, the [1,1] "mark" and "space" data bit value combination is re-resolved by retaining the sliced value from the "mark" and "space" power estimates that currently has the larger SNR, thereby forcing the [1,1] combination to [0,1] where the "mark" SNR is larger and to [1,0] where the "space" SNR is larger. Performance of parallel BASK technique is close to that of FSK where both tones have good SNR.

Figure 17:
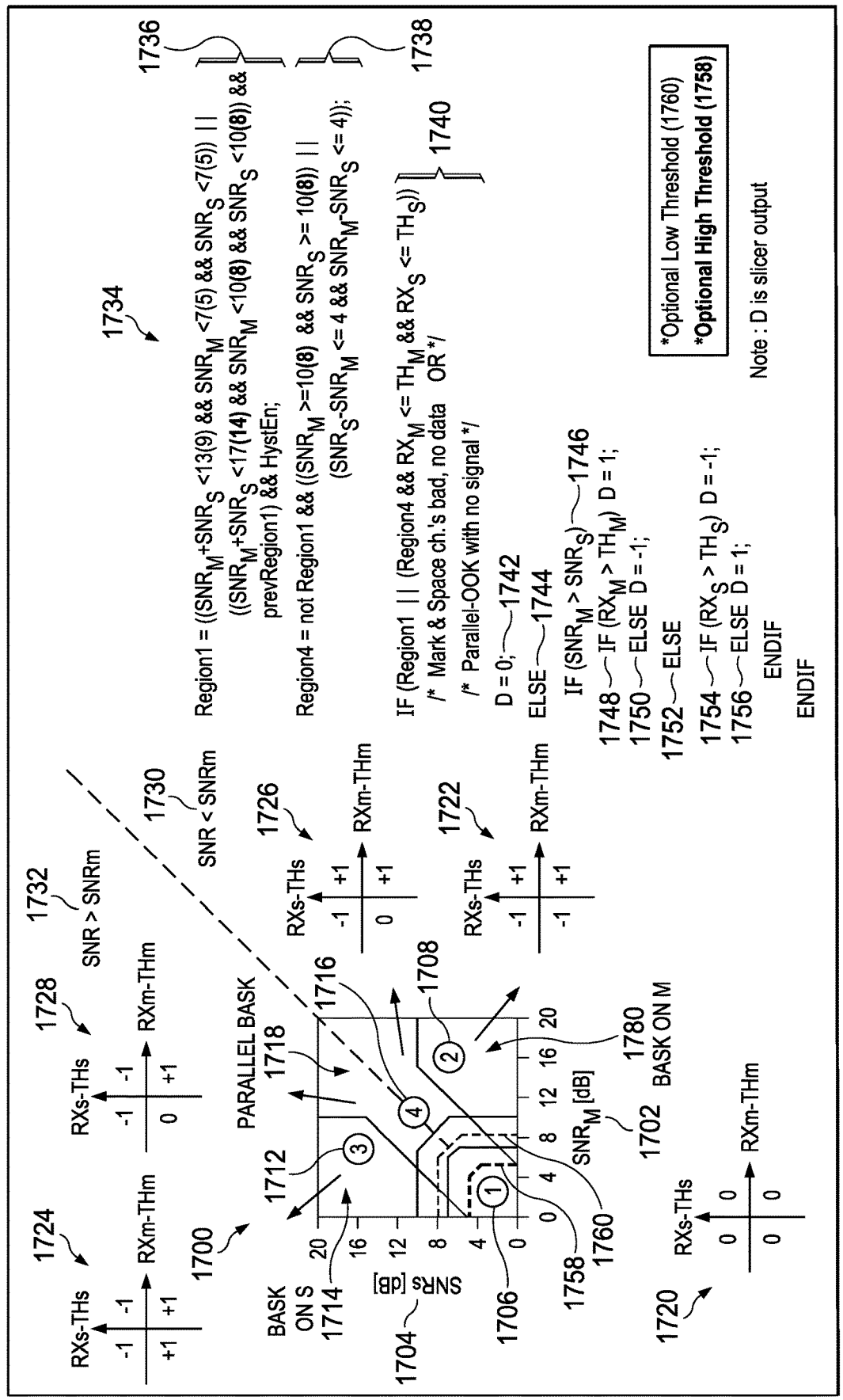
FIG. 17 is an example of an implementation for selecting a bit slicing technique from a set of available techniques.

With reference to FIG. 17, the drawing shows an example of an implementation for selecting a bit slicing technique from a set of four available techniques based on mapping "mark" and "space" SNR parameters on a coordinate system divided into regions corresponding to the available techniques. If the "mark' and "space" SNR parameters map to Region 1, a "zero energy" bit slicing technique is selected. Mapping the "mark' and "space" SNR parameters map to Region 2 causes the selection of a BASK bit slicing technique tailored to the "mark" frequency signal. If the "mark' and "space" SNR parameters map to Region 3, a BASK bit slicing technique tailored to the "space" frequency power estimate is selected. Mapping the "mark' and "space" SNR parameters map to Region 4 causes the selection of a parallel BASK bit slicing technique that generates tri-level values in conjunction with the bit slicing.

For Region 1, the bit slicing circuit outputs a "0" data bit value for the bit period. For Region 2, the bit slicing circuit outputs a "+1" data bit value for the bit period if the "mark" frequency power estimate reflects an "ON" logic level and a "−1" data bit value if the "mark" frequency power estimate reflects an "OFF" logic level. For Region 3, the bit slicing circuit outputs a "−1" data bit value for the bit period if the "space" frequency power estimate reflects an "ON" logic level and a "+1" data bit value if the "space" frequency power estimate reflects an "OFF" logic level. For Region 4, the bit slicing circuit outputs: 1) a "0" data bit value for the bit period if the "mark" and "space" frequency power estimate both reflect "OFF" logic levels; 2) a "+1" data bit value if the "mark" frequency power estimate reflects an "ON" logic level and the "space" frequency power estimate reflects an "OFF" logic level; and 3) a "−1" data bit value if the "mark" frequency power estimate reflects an "OFF" logic level and the "space" frequency power estimate reflects an "ON" logic level. If both the "mark" and "space" frequency power estimates reflect an "ON" logic level in Region 4, the bit slicing circuit outputs a "+1" data bit value if the "mark" SNR parameter is greater than the "space" SNR parameter, otherwise a "−1" data bit value is output for this condition.

With continued reference to FIG. 17, the pseudocode provides an example of region selection and data bit value selection for a bit slicer circuit of an S-FSK receiver compliant with SunSpec Interoperability Specification, Communication Signal for Rapid Shutdown, Version 34.

In this example, Region 1 is selected where a sum of the "mark" and "space" SNR parameters is less than 13 (9 for an optional falling hysteresis threshold) AND the "mark" SNR parameter is less than 7 (5 for an optional falling hysteresis threshold) AND the "space" SNR parameter is less than 7 (5 for an optional falling hysteresis threshold) OR a sum of the "mark" and "space" SNR parameters is less than 17 (14 for an optional rising hysteresis threshold) AND the "mark" SNR parameter is less than 10 (8 for an optional rising hysteresis threshold) AND the "space" SNR parameter is less than 10 (8 for an optional falling hysteresis threshold) AND a hysteresis enable signal is activated.

Region 4 is selected when Region 1 is not selected AND the "mark" SNR parameter is greater than or equal to 10 (8 for an optional rising hysteresis threshold) AND the "space" SNR parameter is greater than or equal to 10 (8 for an optional rising hysteresis threshold); OR a difference between the "space" and "mark" SNR parameters is less than or equal to 4 AND a difference between the "mark" and "space" SNR parameters is less than or equal to 4.

In this example, if Region 1 is selected OR Region 4 is selected AND the "mark" frequency power estimate is less than or equal to a "mark" threshold parameter AND the "space" frequency power estimate is less than or equal to a "space" threshold parameter, both the "mark" and "space" frequency power estimates are bad, there is no data, or there is no power estimate for a parallel-OOK. If this condition exists, the bit slicing circuit outputs a "0" data bit value, otherwise the data bit generation process continues.

Where the data bit generation process continues, if the "mark" SNR parameter is greater than the "space" SNR parameter AND if the "mark" frequency power estimate is greater than the "mark" threshold parameter, the bit slicing circuit outputs a "+1" data bit value, otherwise a "−1" data bit value is output for this condition.

Where the data bit generation process continues, if the "mark" SNR parameter is NOT greater than the "space" SNR parameter AND if the "space" frequency power estimate is greater than the "space" threshold parameter, the bit slicing circuit outputs a "−1" data bit value, otherwise a "+1" data bit value is output for this condition.

Various examples described herein provide a low-complexity bit slicing circuit design for S-FSK demodulation that operate at relatively lower SNRs for the "mark" and "space" frequency signals. The examples work seamlessly under conditions of dynamically changing SNRs. The slicing thresholds are chosen based on acceptable error rates for +1 symbol and −1 symbol for data bit values.

A hysteresis can be added between the no-power estimate region (see, e.g., FIG. 13, Region 1) and the active regions (see, e.g., FIG. 12, Regions 2, 3, and 4) to prevent the link from chattering between link-up and link-down states.

For the parallel BASK bit slicing technique (see, e.g., FIG. 17), the bit slicing circuit output is tri-level (e.g., +1, 0, or −1). After decoding for the higher level code, the transmitted binary bit-stream is recovered. For example, correlation of the slicer output with a barker sequence (with +1 and −1 levels) in SunSpec Interoperability Specification, Communication Signal for Rapid Shutdown, Version 34.

Use of the tri-level parallel BASK bit slicing technique, the BASK bit slicing technique tailored to the "mark" frequency power estimate, and the BASK bit slicing technique tailored to the "space" frequency power estimate can be combined in one example of the bit slicing circuit. In this example, the bit slicing circuit can dynamically select from the available bit slicing techniques for slicing data bits carried by an S-FSK waveform based on SNRs for the "mark" and "space" frequency signals.

Various examples of the bit slicing circuit described herein can optionally implement a hysteresis on the switchover thresholds between regions when using the regions to select a desired bit slicing technique from a set of available bit slicing techniques. In one example, the switchover thresholds are programmable to allow a user to tradeoff robustness with data rate.

In one example, the bit slicing circuit includes a logger to record the amount of time the SNR is reported in the NODATA region of the slicer where no data decoding is done. This can be used for diagnostic reporting.

Various examples of the bit slicing circuit described herein use of a tri-level parallel BASK bit slicing technique for S-FSK demodulation where both the "mark" and "space" frequency power estimates have good SNR. In several examples, the bit slicing circuit seamlessly switches between available bit slicing techniques as the SNRs dynamically change.

The various examples of the bit slicing circuit described herein provide low complexity, good performance (e.g., low error rate), and are robust even with dynamically varying signal amplitudes. The various examples handle dynamically varying SNRs of the "mark' and "space" frequency signals. The bit slicing circuits described herein work with narrow band interferers which come and go on the "mark" and "space" frequency signals.

Modifications are possible in the described examples, and other examples are possible, within the scope of the claims. The various circuits described above can be implemented using any suitable combination of discrete components, integrated circuits, processors, memory, storage devices, and firmware.

The following is claimed:

1. An integrated circuit, comprising:
   a bit slicing circuit, including:
      a processing circuit, configured to receive first and second discrete frequency power estimates, in which the first and second discrete frequency power estimates are based on a spread frequency-shift keying (S-FSK) waveform, in which the first and second discrete frequency power estimates are representative of digital logic levels in a series of data frames modulated using S-FSK to form the S-FSK waveform, each data frame including at least one word, and each word includes multiple bit periods;
   in which the processing circuit is configured to receive first and second signal-to-noise ratio (SNR) parameters, in which the first and second SNR parameters represent a dynamic SNR for the respective first and second discrete frequency power estimates in relation to the series of data frames; and
   in which the processing circuit is configured to select a bit slicing technique from a set of available bit slicing techniques to generate a data bit value for an individual bit period of the first and second discrete frequency power estimates based on the first and second SNR parameters.

2. The integrated circuit of claim 1, including:
   a digital filtering circuit; and
   a parameter computation circuit;
   in which the digital filtering circuit is configured to receive the S-FSK waveform, process the S-FSK waveform to create the first and second discrete frequency power estimates, and provide the first and second discrete frequency power estimates to the processing circuit; and in which the parameter computation circuit is configured to receive the first and second discrete frequency power estimates from the digital filtering circuit, process the first and second discrete frequency power estimates to create the first and second SNR parameters, and provide the first and second SNR parameters to the processing circuit.

3. The integrated circuit of claim 2, in which the processing circuit is configured to generate bit data values for the bit periods of the words of the series of data frames and generate a digital data stream based on the bit data values, in which the digital data stream is representative of the digital logic levels in the series of data frames modulated using S-FSK to form the S-FSK waveform, the integrated circuit including:

a correlator circuit, configured to receive the digital data stream from the processing circuit, decode the digital data stream into code words, correlate the code words based on a predetermined protocol, and generate one or more intermediate control signals based on the code words and the predetermined protocol; and a keep alive circuit, configured to receive the one or more intermediate control signals from the correlator circuit, process the one or more intermediate control signals to generate one or more communication signals, and provide the one or more communication signals at an output terminal.

4. The integrated circuit of claim 1, in which, in conjunction with selecting the bit slicing technique, the processing circuit is configured to select a "zero energy" bit slicing technique to generate a "0" value as the data bit value for the individual bit period where:
i) a sum of the first and second SNR parameters is less than a first SNR threshold;
ii) the first SNR parameter is less than a second SNR threshold; and
iii) the second SNR parameter is less than the second SNR threshold, in which the second SNR threshold is less than the first SNR threshold.

5. The integrated circuit of claim 1, in which, in conjunction with selecting the bit slicing technique, the processing circuit is configured to select a binary amplitude-shift keying (BASK) bit slicing technique tailored to the first discrete frequency power estimate to generate a binary value as the data bit value for the individual bit period where:
i) the first SNR parameter is greater than a second SNR threshold;
ii) the second SNR parameter is less than the second SNR threshold; and
iii) a difference between the first and second SNR parameters is greater than a third SNR threshold, in which the third SNR threshold is less than the second SNR threshold.

6. The integrated circuit of claim 1, in which, in conjunction with selecting the bit slicing technique, the processing circuit is configured to select a binary amplitude-shift keying (BASK) bit slicing technique tailored to the second discrete frequency power estimate to generate the binary value as the data bit value for the individual bit period where:
i) the first SNR parameter is less than a second SNR threshold;
ii) the second SNR parameter is greater than the second SNR threshold; and iii) a difference between the second and first SNR parameters is greater than a third SNR threshold, in which the third SNR threshold is less than the second SNR threshold.

7. The integrated circuit of claim 1, in which, in conjunction with selecting the bit slicing technique, the processing circuit is configured to select a parallel binary amplitude-shift keying (BASK) bit slicing technique to generate a tri-level value as the data bit value for the individual bit period where:
a. i) a sum of the first and second SNR parameters is less than a first SNR threshold, ii) the first or second SNR parameter is greater than the second SNR threshold, iii) a difference between the second and first SNR parameters is less than a third SNR threshold, and iv) a difference between the first and second SNR parameters is less than the third SNR threshold, in which the second SNR threshold is less than the first SNR threshold and greater than the third SNR threshold; or
b. i) a difference between the second and first SNR parameters is less than the third SNR threshold, ii) a difference between the first and second SNR parameters is less than the third SNR threshold, and iii) a sum of the first and second SNR parameters is greater than the first SNR threshold; or
c. i) the first SNR parameter is greater than the second SNR threshold and ii) the second SNR parameter is greater than the second SNR threshold.

8. The integrated circuit of claim 7, in which, in conjunction with selecting the parallel BASK bit slicing technique, the processing circuit is configured to:

receive first and second threshold parameters, in which the first and second threshold parameters represent dynamic thresholds between "ON" and "OFF" logic levels for bit periods associated with the respective first and second discrete frequency power estimates in relation to the series of data frames;

determine the first discrete frequency power estimate is at an "ON" logic level for the individual bit period where the first discrete frequency power estimate is greater than the first threshold parameter;

determine the second discrete frequency power estimate is at an "ON" logic level for the individual bit period where the second discrete frequency power estimate is greater than the second threshold parameter; and after determining both first and second discrete frequency power estimates are at "ON" logic levels, generate a "+1" tri-level value as the data bit value for the individual bit period where the first SNR parameter is greater than the second SNR parameter, otherwise generate a "−1" tri-level value as the data bit value for the individual bit period.

9. A process for performing bit slicing in a spread frequency-shift keying (S-FSK) receiver, the process comprising:

receiving first and second discrete frequency power estimates at a bit slicing circuit, in which the first and second discrete frequency power estimates are based on an S-FSK waveform, the first and second discrete frequency power estimates are representative of digital logic levels in a series of data frames modulated using S-FSK to form the S-FSK waveform, each data frame including at least one word, and each word includes bit periods;

receiving first and second signal-to-noise ratio (SNR) parameters at the bit slicing circuit, in which the first and second SNR parameters represent a dynamic SNR for the respective first and second discrete frequency power estimates in relation to the series of data frames; and selecting a bit slicing technique from a set of available bit slicing techniques to generate a data bit value for an individual bit period of the first and second discrete frequency power estimates based on the first and second SNR parameters.

10. The process of claim 9, including:

selecting a "zero energy" bit slicing technique to generate a "0" value as the data bit value for the individual bit period where:

i) a sum of the first and second SNR parameters is less than a first SNR threshold;

ii) the first SNR parameter is less than a second SNR threshold; and iii) the second SNR parameter is less than the second SNR threshold, in which the second SNR threshold is less than the first SNR threshold.

11. The process of claim 9, including:

selecting a binary amplitude-shift keying (BASK) bit slicing technique tailored to the first discrete frequency power estimate to generate a binary value as the data bit value for the individual bit period where:

i) the first SNR parameter is greater than a second SNR threshold;

ii) the second SNR parameter is less than the second SNR threshold; and iii) a difference between the first and second SNR parameters is greater than a third SNR threshold, in which the third SNR threshold is less than the second SNR threshold.

12. The process of claim 9, including:

selecting a binary amplitude-shift keying (BASK) bit slicing technique tailored to the second discrete frequency power estimate to generate the binary value as the data bit value for the individual bit period where:

i) the first SNR parameter is less than a second SNR threshold;

ii) the second SNR parameter is greater than the second SNR threshold; and iii) a difference between the second and first SNR parameters is greater than a third SNR threshold, in which the third SNR threshold is less than the second SNR threshold.

13. The process of claim 9, including:

selecting a parallel binary amplitude-shift keying (BASK) bit slicing technique to generate a tri-level value as the data bit value for the individual bit period where:

a. i) a sum of the first and second SNR parameters is less than a first SNR threshold, ii) the first or second SNR parameter is greater than a second SNR threshold, iii) a difference between the second and first SNR parameters is less than a third SNR threshold, and iv) a difference between the first and second SNR parameters is less than the third SNR threshold, in which the second SNR threshold is less than the first SNR threshold and greater than the third SNR threshold; or b. i) a difference between the second and first SNR parameters is less than the third SNR threshold, ii) a difference between the first and second SNR parameters is less than the third SNR threshold, and iii) a sum of the first and second SNR parameters is greater than the first SNR threshold; or c. i) the first SNR parameter is greater than the second SNR threshold and ii) the second SNR parameter is greater than the second SNR threshold.

14. The process of claim 9, in which the selecting of the bit slicing technique includes:

arranging the first and second SNR parameters for the individual bit period as an ordered pair in relation to a coordinate system with a first axis representative of the first SNR parameter and a second axis representative of the second SNR parameter, in which the coordinate system uses predetermined SNR thresholds to define regions within the coordinate system representative of alternate bit slicing techniques from the set of available bit slicing techniques; and selecting the bit slicing technique based on a specific region of the coordinate system with which the ordered pair for the first and second SNR parameters is associated.

15. The process of claim 14, in which the selecting of the bit slicing technique includes:

selecting a "zero energy" bit slicing technique to generate a "0" value as the data bit value for the individual bit period where the first and second SNR parameters are associated with a first region of the coordinate system.

16. The process of claim 15, in which the first region of the coordinate system is defined by rising and falling thresholds that provide a hysteresis for transitions between the first region and other regions of the coordinate system based on the first and second SNR parameters in relation to the series of data frames, the process including:

receiving a hysteresis enable signal at the bit slicing circuit, in which the hysteresis enable signal activates use of the rising and falling thresholds;

in which the rising threshold for the hysteresis causes the "zero energy" bit slicing technique to be de-selected where: i) the sum of the first and second SNR parameters is rising in relation to a preceding sum and becomes greater than a first SNR threshold, ii) the first SNR parameter is rising in relation to a preceding value for the first SNR parameter and becomes greater than a second SNR threshold, and iii) the second SNR parameter is rising in relation to a preceding value for the second SNR parameter and becomes greater than the second SNR threshold, in which the second SNR threshold is less than the first SNR threshold;

in which the falling threshold for the hysteresis causes the "zero energy" bit slicing technique to be selected where: i) the sum of the first and second SNR parameters is falling in relation to a preceding sum and becomes less than a fourth SNR threshold, ii) the first SNR parameter is falling in relation to the preceding value for the first SNR parameter and becomes less than a fifth SNR threshold, and iii) the second SNR parameter is falling in relation to the preceding value for the second SNR parameter and becomes less than the fifth SNR threshold, in which the fifth SNR threshold is less than the fourth SNR threshold; and in which the fifth SNR threshold is less than the second SNR threshold and the fourth SNR threshold is less than the first SNR threshold.

17. The process of claim 14, in which the selecting of the bit slicing technique includes:

selecting a binary amplitude-shift keying (BASK) bit slicing technique tailored to the first discrete frequency power estimate to generate a binary value as the data bit value for the individual bit period where the first and second SNR parameters are associated with a second region of the coordinate system.

18. The process of claim 14, in which the selecting of the bit slicing technique includes:

selecting a binary amplitude-shift keying (BASK) bit slicing technique tailored to the second discrete frequency power estimate to generate a binary value as the data bit value for the individual bit period where the first and second SNR parameters are associated with a third region of the coordinate system.

19. The process of claim 14, in which the selecting of the bit slicing technique includes:
selecting a parallel binary amplitude-shift keying (BASK) bit slicing technique to generate a tri-level value as the data bit value for the individual bit period where the first and second SNR parameters are associated with a fourth region of the coordinate system.

20. A process for performing bit slicing in a spread frequency-shift keying (S-FSK) receiver, the process comprising:
receiving first and second discrete frequency power estimates at a bit slicing circuit, in which the first and second discrete frequency power estimates are based on an S-FSK waveform, in which the first and second discrete frequency power estimates are representative of digital logic levels in a series of data frames modulated using S-FSK to form the S-FSK waveform, each data frame including at least one word, and each word includes bit periods;
receiving first and second threshold parameters at the bit slicing circuit, in which the first and second threshold parameters represent dynamic thresholds between "ON" and "OFF" logic levels for bit periods associated with the respective first and second discrete frequency power estimates in relation to the series of data frames;
determining the first discrete frequency power estimate is at an "ON" logic level for an individual bit period where the first discrete frequency power estimate is greater than the first threshold parameter;
determining the second discrete frequency power estimate is at an "ON" logic level for the individual bit period where the second discrete frequency power estimate is greater than the second threshold parameter;
receiving first and second signal-to-noise ratio (SNR) parameters at the bit slicing circuit, in which the first and second SNR parameters represent a dynamic SNR for the respective first and second discrete frequency power estimates in relation to the series of data frames;
after determining both first and second discrete frequency power estimates are at "ON" logic levels, generating a "+1" tri-level value as a data bit value for an individual bit period of the first and second discrete frequency power estimates where the first SNR parameter is greater than the second SNR parameter, otherwise generating a "−1" tri-level value as the data bit value for the individual bit period.

* * * * *